US012577957B2

(12) United States Patent
Li

(10) Patent No.: US 12,577,957 B2
(45) Date of Patent: Mar. 17, 2026

(54) CENTRIFUGAL BLOWER INCLUDING SHROUDED MIXED FLOW IMPELLER FOR ENHANCED COOLING

(71) Applicant: BLOOM ENERGY CORPORATION, San Jose, CA (US)

(72) Inventor: Shuo Li, Fremont, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 173 days.

(21) Appl. No.: 18/328,212

(22) Filed: Jun. 2, 2023

(65) Prior Publication Data

US 2023/0392606 A1 Dec. 7, 2023

Related U.S. Application Data

(60) Provisional application No. 63/365,833, filed on Jun. 3, 2022.

(51) Int. Cl.
*F04D 29/28* (2006.01)
*F04D 17/08* (2006.01)
*F04D 29/42* (2006.01)
*F04D 29/44* (2006.01)
*F04D 29/58* (2006.01)
(Continued)

(52) U.S. Cl.
CPC ........... *F04D 29/281* (2013.01); *F04D 17/08* (2013.01); *F04D 29/4206* (2013.01); *F04D 29/441* (2013.01); *F04D 29/584* (2013.01); *H02K 5/1732* (2013.01); *H02K 5/207* (2021.01); *H02K 7/083* (2013.01); *H02K 9/06* (2013.01); *H01M 8/04111* (2013.01); *H01M 2008/1293* (2013.01)

(58) Field of Classification Search
None
See application file for complete search history.

(56) References Cited

U.S. PATENT DOCUMENTS 1,681,780 A * 8/1928 Pensabene ............... H02K 9/18
310/57
2,294,586 A * 9/1942 Troller ................ F04D 29/5806
416/93 R
(Continued)

FOREIGN PATENT DOCUMENTS

CN 304180312 S 6/2017
CN D304975819 S 1/2019
(Continued)

OTHER PUBLICATIONS

Office Communication for Japanese Application No. 2021-023417, mailed Jun. 10, 2022.
(Continued)

*Primary Examiner* — Bryan M Lettman
*Assistant Examiner* — Geoffrey S Lee
(74) *Attorney, Agent, or Firm* — THE MARBURY LAW GROUP PLLC

(57) ABSTRACT

A blower includes a motor housing, a volute disposed on an outer surface of the motor housing, a motor shaft extending through the motor housing, a motor disposed in the motor housing and coaxially mounted to the motor shaft, and a mixed flow impeller disposed in the motor housing and coaxially mounted to the motor shaft. The mixed flow impeller is configured to circulate air inside the motor housing.

17 Claims, 20 Drawing Sheets

(51) Int. Cl.

| | | |
|---|---|---|
| *H01M 8/04111* | (2016.01) | |
| *H02K 5/173* | (2006.01) | |
| *H02K 5/20* | (2006.01) | |
| *H02K 7/08* | (2006.01) | |
| *H02K 9/06* | (2006.01) | |
| *H01M 8/12* | (2016.01) | |

(56) References Cited

U.S. PATENT DOCUMENTS

| | | | | |
|---|---|---|---|---|
| 2,321,126 A * | 6/1943 | Grant | | F04D 25/082 |
| | | | | 417/423.1 |
| 2,410,973 A * | 11/1946 | Hoover | | H02K 5/132 |
| | | | | 417/367 |
| 3,119,942 A * | 1/1964 | Luther | | H02K 7/145 |
| | | | | 310/90 |
| 3,653,785 A * | 4/1972 | Dahlgren | | F04D 29/586 |
| | | | | 165/47 |
| 3,782,303 A * | 1/1974 | Pfister | | F23L 17/00 |
| | | | | 454/168 |
| 3,875,436 A * | 4/1975 | MacFarland | | A47L 9/2889 |
| | | | | 310/43 |
| 3,897,178 A * | 7/1975 | Palloch | | F04D 13/06 |
| | | | | 417/369 |
| 4,189,281 A * | 2/1980 | Katagiri | | F04D 29/384 |
| | | | | 165/122 |
| 5,375,651 A * | 12/1994 | Colwell | | F04D 25/082 |
| | | | | 110/162 |
| 6,398,512 B2 * | 6/2002 | Stewart | | F04D 25/082 |
| | | | | 417/53 |
| 6,700,235 B1 * | 3/2004 | McAfee | | H02K 9/06 |
| | | | | 310/58 |
| 6,854,517 B2 * | 2/2005 | Gay | | F04D 13/10 |
| | | | | 417/247 |
| 7,425,119 B2 | 9/2008 | Bolz | | |
| 8,440,362 B2 | 5/2013 | Richards et al. | | |
| 8,704,414 B2 * | 4/2014 | Rai | | H02K 9/16 |
| | | | | 310/60 A |
| 9,190,693 B2 | 11/2015 | Sridhar et al. | | |
| 9,494,162 B2 | 11/2016 | Haaf et al. | | |
| 9,616,188 B2 * | 4/2017 | Grasmuck | | F04D 29/584 |
| 10,533,560 B2 * | 1/2020 | Kim | | F04D 25/16 |
| 11,196,068 B2 | 12/2021 | Weingaertner et al. | | |
| 11,261,879 B2 | 3/2022 | Akamatsu et al. | | |
| 12,132,379 B2 * | 10/2024 | Prat | | A61M 16/0066 |
| 2004/0140081 A1 * | 7/2004 | Miller | | F24D 12/02 |
| | | | | 165/47 |
| 2006/0081226 A1 | 4/2006 | Bolz | | |
| 2006/0165523 A1 * | 7/2006 | Rozario | | F04D 29/126 |
| | | | | 415/206 |
| 2006/0198727 A1 * | 9/2006 | Arnold | | F02B 37/013 |
| | | | | 415/169.1 |
| 2009/0044548 A1 * | 2/2009 | Masoudipour | | F25B 1/04 |
| | | | | 62/505 |
| 2009/0183858 A1 * | 7/2009 | Williams | | G05D 23/192 |
| | | | | 165/181 |
| 2009/0291004 A1 * | 11/2009 | Grasmuck | | H02K 5/12 |
| | | | | 417/423.1 |
| 2010/0189554 A1 * | 7/2010 | Grasmuck | | H02K 9/14 |
| | | | | 415/198.1 |

| | | | | |
|---|---|---|---|---|
| 2013/0062976 A1 * | 3/2013 | Rai | | H02K 9/16 |
| | | | | 310/61 |
| 2014/0202202 A1 * | 7/2014 | Taguchi | | F04D 29/4213 |
| | | | | 415/58.3 |
| 2015/0219119 A1 | 8/2015 | Nitta et al. | | |
| 2016/0069352 A1 | 3/2016 | Kreidler et al. | | |
| 2016/0352181 A1 * | 12/2016 | Randria | | H02K 9/16 |
| 2018/0172028 A1 * | 6/2018 | Kim | | F04D 25/16 |
| 2019/0271326 A1 | 9/2019 | Cao et al. | | |
| 2020/0200188 A1 * | 6/2020 | Akamatsu | | F04D 29/4206 |
| 2020/0243885 A1 | 7/2020 | Weingaertner et al. | | |
| 2021/0328238 A1 | 10/2021 | Cedarleaf-Pavy et al. | | |
| 2022/0333613 A1 | 10/2022 | Li | | |
| 2022/0360143 A1 * | 11/2022 | Prat | | A61M 16/12 |
| 2023/0304706 A1 * | 9/2023 | Moon | | F04D 17/122 |

FOREIGN PATENT DOCUMENTS

| | | |
|---|---|---|
| CN | D305967378 S | 8/2020 |
| CN | D306113503 S | 10/2020 |
| CN | 306322096 S | 2/2021 |
| CN | 306637385 S | 6/2021 |
| CN | 306885497 S | 10/2021 |
| CN | 307043018 S | 12/2021 |
| EP | 15665489 A2 | 8/2005 |
| JP | 09-098913 A | 4/1997 |
| KR | 30-0513851 | 11/2008 |
| TW | D213617 | 3/2005 |
| TW | M258188 | 3/2005 |
| TW | 202032019 A | 9/2020 |
| TW | D194294 | 8/2021 |
| WO | WO2019-049202 A1 | 3/2019 |

OTHER PUBLICATIONS

KIPO Office Communication, Notification of Preliminary Rejection, for Korean Design Application No. 30-2021-0052145, mailed Aug. 2, 2022, 3 pages.

Office Communication Notice of Allowance Decision for ROC (Taiwan) Patent Application No. 110305746, mailed May 23, 2022, 10 pages.

Office Action and Search Report for ROC (Taiwan) Patent Application No. 110305750, mailed May 23, 2022, 10 pages.

European Patent Office Communication, Partial European Search Report for European Patent Application No. 22168640.5, mailed Sep. 13, 2022, 13 pages.

China National Intellectual Property Administration ("CNIPA"), First Office Action for PRC (China) Patent Application No. 202220876457.9, mailed Oct. 11, 2022, 2 pages.

Decision of Rejection Action for ROC (Taiwan) Patent Application No. 110305750, mailed Oct. 31, 2022, 5 pages (including English-language translation).

European Patent Office Communication, Extended European Search Report for European Patent Application No. 22168640.5, mailed Dec. 22, 2022, 14 pages.

Extended European Search Report for Patent Application No. 23176893.8, mailed Oct. 20, 2023, 7 pages.

EPO Office Communication pursuant to Article 94(3) EPC for European Patent Application No. 23176893.8, mailed Nov. 27, 2025, 5 pages.

* cited by examiner

400

404
402
408
412
410
416
414
418
418
414
410
412
408
402
404

406
426
424
420
462
500
432
428
422
430
424

Motor 800

400

440

416

410      450

402

600

700

900

900

900

900

900

900

924

922

920

910

CENTRIFUGAL BLOWER INCLUDING SHROUDED MIXED FLOW IMPELLER FOR ENHANCED COOLING

FIELD

Aspects of the present disclosure relate to blowers, such as blowers for a fuel cell system.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to various embodiments, a blower comprises a motor housing; a volute disposed on an outer surface of the motor housing; a motor shaft extending through the motor housing; a motor disposed in the motor housing and coaxially mounted to the motor shaft; and a mixed flow impeller disposed in the motor housing and coaxially mounted to the motor shaft, wherein the mixed flow impeller is configured to circulate air inside the motor housing.

According to various embodiments, a motor comprises a motor housing; a motor shaft extending through the motor housing; a first bearing and a second bearing disposed in the motor housing and supporting the motor shaft; a stator disposed in the motor housing; a rotor disposed in the stator and coaxially mounted to the motor shaft; and a mixed flow impeller disposed in the motor housing and coaxially mounted to the motor shaft, wherein the mixed flow impeller is configured to circulate air inside of the motor housing.

According to various embodiments, a method of cooling a motor disposed in a motor housing comprises: operating the motor to rotate a motor shaft and a mixed flow impeller mounted on the motor shaft and disposed in the motor housing, such that the mixed flow impeller circulates air within the motor housing.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1:
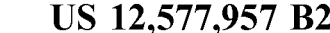
FIG. 1 is a perspective view of a fuel cell system, according to various embodiments suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Air and other gas blowers are integral components of fuel cell systems which move air or another gas (e.g., fuel) throughout the system for cooling, providing air or fuel for generation of electricity, or exhaust recycling and/or venting. The various embodiments described herein provide device structures and functions for components of a blower. In some embodiments, the blower may include an impeller having varying length blades. The impeller blades may include full blades of a first length and splitter blades of a second length that is less that the first length. The impeller blades may have a trailing edge lean angle toward the direction of rotation of the impeller. The impeller blades may have a high back sweep angle at the trailing edge. In some embodiments, the blower may include a volute that, at least in part, forms at least part of a motor housing portion of the blower hosing. The volute may be elliptical having a greater width than height.

The various embodiments described herein may be described in terms of a blower for air. One of ordinary skill in the art will recognize that such descriptions of a blower for air may be similarly applicable to a blower for ambient air or a blower for conditioned air, such as heat air, cooled air, humidified air, dehumidified air, etc. One of ordinary sill in the art will recognize that such descriptions of a blower for air may be similarly applicable to a blower for fuel gas or a blower for exhaust gas, such as anode exhaust recycle gas in a fuel cell system.

The embodiments described herein provide advantages over existing blower component designs by improving blower housing and impeller designs. The blower housing architecture may be an integrated design using blower volute to actively cool the blower motor. A high aspect ratio ellipse cross-section shape blower volute (e.g., greater than 2, such as 2.1 to 10, including 2.2, 2.3, 2.4, etc. to 3) may be placed on an opposite side (e.g., on the motor side) of an impeller compared to traditional blower configurations. A volute wall may form at least a portion of a motor housing portion of the blower. A low temperature, high velocity air flow inside the volute may be used to remove heat conducted through the volute wall from the motor, functioning as an active heat sink for the motor. In some embodiments, the elliptical volute may be used in combination with a finned radiator portion of the motor housing, and a typical cooling fan for the motor may be omitted. In some embodiments, a blower impeller may be mounted directly on a motor shaft of the blower motor. Any of the embodiments of the blower architecture may provide advantages over existing blower design by reducing the size, cost, and/or noise and increasing reliability compared to existing blowers, such as by using a smaller form factor of using the elliptical volute or through omission of parts, such as the cooling fan for the motor or additional coupling elements for coupling the blower impeller and the motor shaft.

A centrifugal blower impeller may include a combination of blade lengths. A splitter blade may be disposed between full blades, where a length of the splitter blade may be less than a length of a full blade. The blades, including the splitter blades and/or the full blades, may have high back swept angles at a trailing edge. For example, a high back sweep angle may be equal to or greater than approximately 45°, such as approximately 45° to approximately 65°. The blades, including the splitter blades and/or the full blades, may have a high lean angle towards a rotating direction of the impeller. For example, a high lean angle may be approximately 35° to approximately 45°, such as approximately 40°. Any of the embodiments of the impeller may provide advantages over existing blower designs by improving efficiency and noise reduction of the impeller. In some embodiments, the improved efficiency may be realized across an operation range, which may include ranges of speed, power, capacity, flow rate, pressure, etc. Some of the embodiments of the impeller, such as the variable blade lengths and/or the lean angles of the blades towards a rotating direction of the impeller may provide advantages over existing blower design by reducing or cancelling noise caused by gas flow through the blower.

FIG. 1 illustrates an example of one electrical power generator which comprises modular fuel cell system that is more fully described in U.S. Pat. No. 8,440,362, incorporated herein by reference for descriptions of the modular fuel cell system. The modular system may contain modules and components described in the above patent as well as in U.S. Pat. No. 9,190,693, which is incorporated herein by reference for descriptions of the modular fuel cell system. The modular design of the fuel cell system enclosure 10 provides flexible system installation and operation.

The modular fuel cell system enclosure 10 includes a plurality of power module housings 12 (containing a fuel cell power module components), one or more fuel input (i.e., fuel processing) module housings 16, and one or more power conditioning (i.e., electrical output) module housings 18. For example, the system enclosure may include any desired number of modules, such as 2-30 power modules, for example 6-12 power modules. FIG. 1 illustrates a system enclosure 10 containing six power modules (one row of six modules stacked side to side), one fuel processing module, and one power conditioning module, on a common base 20. Each module may comprise its own cabinet or housing. Alternatively, the power conditioning and fuel processing modules may be combined into a single input/output module located in one cabinet or housing 14. For brevity, each housing 12, 14, 16, 18 will be referred to as "module" below.

While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power, electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in an example embodiment in FIG. 1, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may include more than one row of modules 12. For example, as noted above, the system may include two rows of power modules stacked back to back.

Each of the power modules 12 and input/output modules 14 include a door 30 (e.g., hatch, access panel, etc.) to allow the internal components of the module to be accessed (e.g., for maintenance, repair, replacement, etc.). According to one embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door 30 to module 14 may be on the side rather than on the front of the cabinet.

Figure 2:
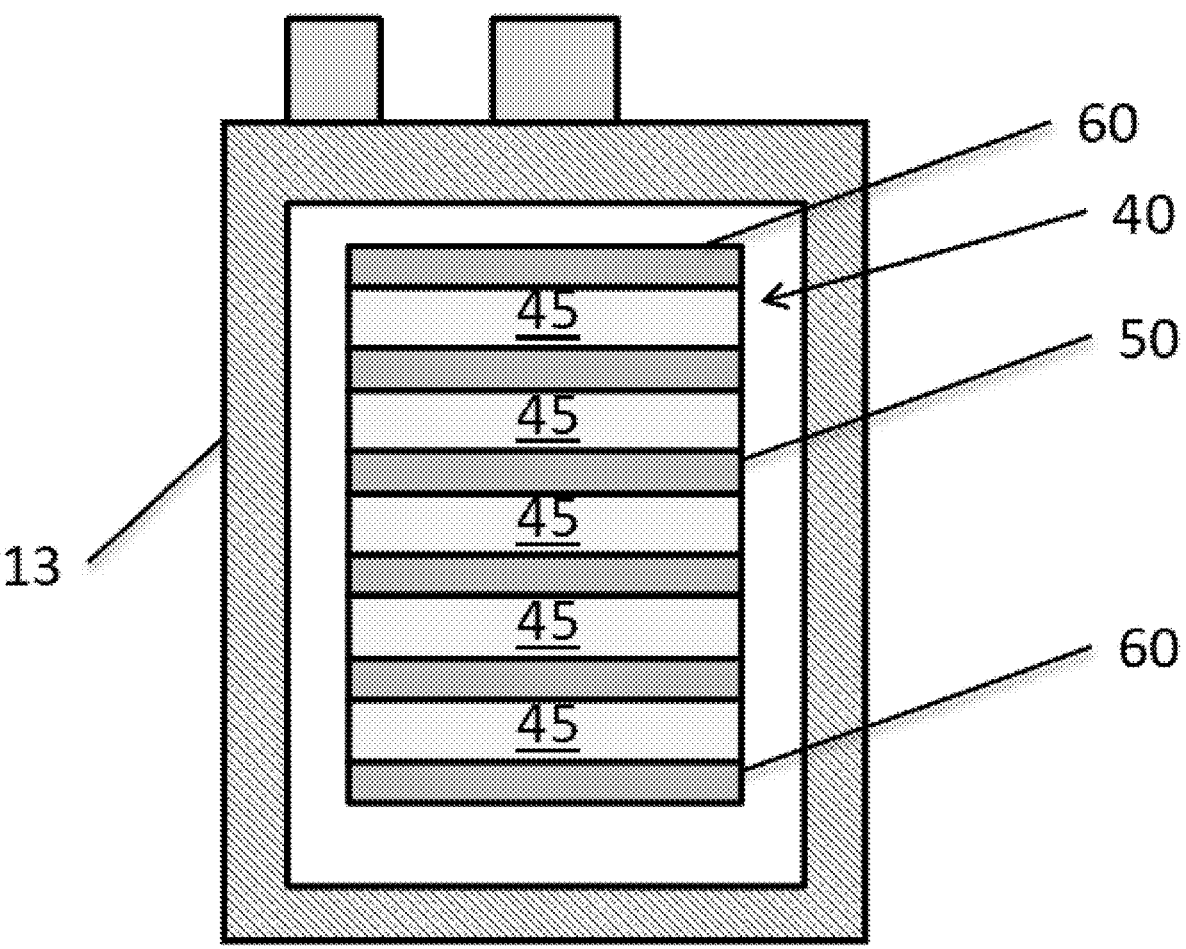
FIG. 2 is a schematic side cross-sectional view of a hot box, according to various embodiments suitable for implementing various embodiments.

FIG. 2 illustrates a plan view of a fuel cell system hotbox 13 including a fuel cell stack or column 40. The hotbox 13 is shown to include the fuel cell stack or column 40. However, the hotbox 13 may include two or more of the stacks or columns 40. The stack or column 40 may include the electrically connected fuel cells 45 stacked on one another, with the interconnects 50 disposed between the fuel cells 45. The first and last fuel cells 45 in the stack or column are disposed between a respective end plate 60 and interconnect 50. The end plates 60 are electrically connected to electrical outputs of the fuel cell stack or column 40. The hotbox 13 may include other components, such as fuel conduits, air conduits, seals, electrical contacts, etc., and may be incorporated into a fuel cell system including balance of plant components. The fuel cells 45 may be solid oxide fuel cells containing a ceramic electrolyte, such as yttria stabilized zirconia (YSZ) or scandia stabilized zirconia (SSZ), an anode electrode, such as a nickel-YSZ, a Ni-SSZ or a nickel-samaria doped ceria (SDC) cermet, and a cathode electrode, such as lanthanum strontium manganite (LSM)). The interconnects 50 and/or end plates 60 may comprise any suitable gas impermeable and electrically conductive material, such as a chromium-iron alloy, such as an alloy containing 4 to 6 wt % iron and balance chromium. The interconnects 50 electrically connect adjacent fuel cells 45 and provide channels for fuel and air to reach the fuel cells 45.

Fuel cell systems, such as modular fuel cell system enclosure 10, may include and/or be augmented by various pieces of support equipment. Support equipment may include various auxiliary equipment and systems to support the operation of the fuel cell system. Support equipment may vary based on constraints and/or features at a site where the fuel cell system is installed. As non-limiting examples, support equipment may include, fuel support equipment, air support equipment, and/or ventilation support equipment. One type of fuel support equipment may include equipment configured to control supply and/or exhaust fuel pressure in the fuel cell system, such as a fuel blower or pump to supply fuel to, recycle fuel/exhaust in, and/or exhaust fuel from the fuel cell system. Another type of fuel support equipment may be configured to process fuel for the fuel cell system, such as a fuel pre-heater, exhaust scrubber, etc. Other types of fuel support equipment may also be used. One type of air support equipment may be air supply equipment configured to provide air into the fuel cell system and/or exhaust air from the fuel cell system, such as blowers or fans to provide air to and/or exhaust air from a fuel cell cathode, an anode tail gas oxidizer (ATO), an air heat exchanger, a CPOx reactor, etc. Other types of air support equipment may also be used. One type of ventilation support equipment may include equipment configured to ventilate from and/or circulate air in portions of housings external of the hot box (e.g., portions within modular fuel cell system enclosure 10 but external of the hot box 13 itself), such as a ventilation fan to blow air from within the enclosure 10 out of the enclosure 10 to maintain an acceptable enclosure 10 pressure. Other types of ventilation support equipment may also be used.

Figure 3:
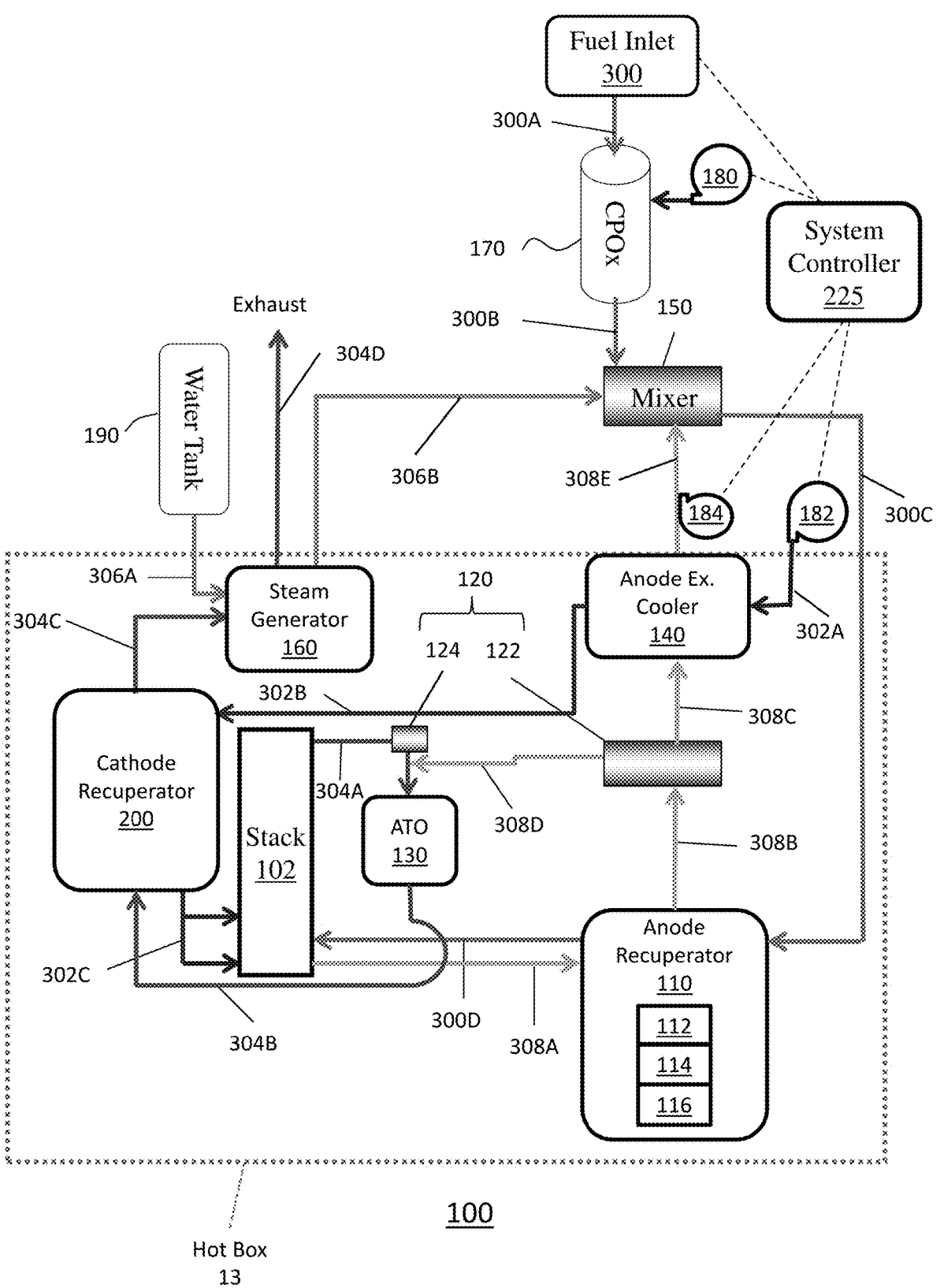
FIG. 3 is a schematic of a SOFC fuel cell system, according to various embodiments of the present disclosure.

FIG. 3 is a schematic representation of a solid oxide fuel cell (SOFC) system 10, according to various embodiments of the present disclosure. Referring to FIG. 1, the system 100 includes a hotbox 13 and various components disposed therein or adjacent thereto. For example, any number and combination of the various components may be disposed within an enclosure (e.g., fuel cell system enclosure 10, power module housing 12, housing 14, fuel input module housing 16, power conditioning module housing 18).

The hot box 13 may contain fuel cell stacks 102, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 102 may be arranged over each other in a plurality of columns.

The hot box 13 may also contain an anode recuperator 110, a cathode recuperator 200, an anode tail gas oxidizer (ATO) 130, an anode exhaust cooler 140, an ATO mixer/injector (which is referred herein as an ATO injector for brevity) 120 including a splitter 122 and a vortex generator 124, and a steam generator 160. The system 10 may also include a catalytic partial oxidation (CPOx) reactor 170, a mixer 150, a CPOx blower 180 (e.g., air blower), a system blower 182 (e.g., air blower), and an anode recycle blower 184, which may be disposed outside of the hotbox 13. However, the present disclosure is not limited to any particular location for each of the components with respect to the hotbox 13.

The CPOx reactor 170 receives a fuel inlet stream from a fuel inlet 300, through fuel conduit 300A. The fuel inlet 300 may be a utility gas line including a valve to control an amount of fuel provided to the CPOx reactor 170. The CPOx blower 180 may provide air to the CPOx reactor 170 during system 10 start-up, and then turned off during steady-state operating mode when the fuel cell stacks 102 reach a steady-state operating temperature above 700° C., such as 750 to 900° C. The fuel in the steady state and/or a mixture of fuel and air during start-up may be provided to the mixer 150 by fuel conduit 300B. Fuel flows from the mixer 150 to the anode recuperator 110 through fuel conduit 300C. Fuel flows from the anode recuperator 110 to the stack 102 through fuel conduit 300D. The system 10 may also include one or more fuel reforming catalysts 112, 114, and 116 in the anode recuperator 110.

The main air blower 182 may be configured to provide an air stream (e.g., air inlet stream) to the anode exhaust cooler 140 through air conduit 302A. Air flows from the anode exhaust cooler 140 to the cathode recuperator 200 through air output conduit 302B. The air flows from the cathode recuperator 200 to the stack 102 through air conduit 302C.

Anode exhaust (i.e., fuel exhaust) generated in the stack 102 is provided to the anode recuperator 110 through anode exhaust outlet conduit(s) 308A. The anode exhaust may contain unreacted fuel. The anode exhaust may also be referred to herein as fuel exhaust. The anode exhaust may be provided from the anode recuperator 110 to the splitter 122 by the anode exhaust conduit 308B. A first portion of the anode exhaust may be provided from the splitter 122 to the ATO 130 via an anode exhaust output conduit 308D. A second portion of the anode exhaust may be provided from the splitter 122 to the anode exhaust cooler 140 by a first anode exhaust recycling conduit 308C. Anode exhaust may be provided from the anode exhaust cooler 140 to mixer 150 by a second anode exhaust recycling conduit 308E. The anode recycle blower 184 may be configured to move anode exhaust though the second anode exhaust recycling conduit 308E, as discussed below.

Cathode exhaust (e.g., air exhaust) generated in the stack 102 flows to the ATO 130 through cathode exhaust conduit 304A. The cathode exhaust may also be referred to herein as air exhaust. The vortex generator 124 may be disposed in the cathode exhaust conduit 304A and may be configured to swirl the cathode exhaust. Conduit 308D may be fluidly connected to the cathode exhaust conduit 304A, downstream of the vortex generator 124. The swirled cathode exhaust exiting the vortex generator 124 may mix with the anode exhaust provided by the splitter 122 before being provided to the ATO 130. The mixture may be oxidized in the ATO 130 to generate ATO exhaust. The ATO exhaust flows from the ATO 130 to the cathode recuperator 200 through exhaust conduit 304B. Exhaust flows from the cathode recuperator 200 to the steam generator 160 through exhaust conduit 304C. Exhaust flows from the steam generator 160 and out of the hotbox 100 through exhaust conduit 304D.

Water flows from a water source 190, such as a water tank or a water pipe, to the steam generator 160 through water conduit 306A. The steam generator 160 converts the water into steam using heat from the ATO exhaust provided by exhaust conduit 304C. Steam is provided from the steam generator 160 to the mixer 150 through water conduit 306B. Alternatively, if desired, the steam may be provided directly into the fuel inlet stream and/or the anode exhaust stream may be provided directly into the fuel inlet stream followed by humidification of the combined fuel streams. The mixer 150 is configured to mix the steam with anode exhaust and fuel. This fuel mixture may then be heated in the anode recuperator 110, before being provided to the stack 102.

The system 10 may further a system controller 225 configured to control various elements (e.g., blowers 182 and 184 and the fuel control valve) of the system 10. The controller 225 may include a central processing unit configured to execute stored instructions. For example, the controller 225 may be configured to control fuel and/or air flow through the system 10, according to fuel composition data.

Blower

In some embodiments, a blower may be a high-performance centrifugal blower that may comprise any of the blowers of the fuel cell system described above with respect to FIG. 1. Thus, the blower may be the CPOx blower 180 (e.g., air blower for the CPOx for system start-up), the system blower 182 (e.g., main air blower for providing air into the fuel cell stacks), and/or the anode recycle blower 184 which recycles the anode exhaust stream from the stacks into the fuel inlet stream. In some embodiments, the blower may be used in a different system than the fuel cell system described above. The blower may operate at wide ranges of fluid (e.g., air and/or gas) flow rates and/or pressures. The blower may be compact in size to be fitted in a limited space available in an enclosure. For example, the enclosure may be an enclosure of the fuel cell system, such as the fuel cell system enclosure 10, the power module housing 12, the housing 14, the fuel input module housing 16, and/or the power conditioning module housing 18. For example, the blower may be sized to fit in the power module housing 12 that may also enclose the hot box 13 in addition to the blower. In some embodiment, the compact size and high-performance operation at wide ranges of fluid flow rates and/or pressures may be achieved by one or more of a blower design, embodiments of which are described herein with reference to FIGS. 4A-4D and/or an impeller design, embodiments of which are described herein with reference to FIGS. 5A-5C, 6, and 7.

Figure 4A:
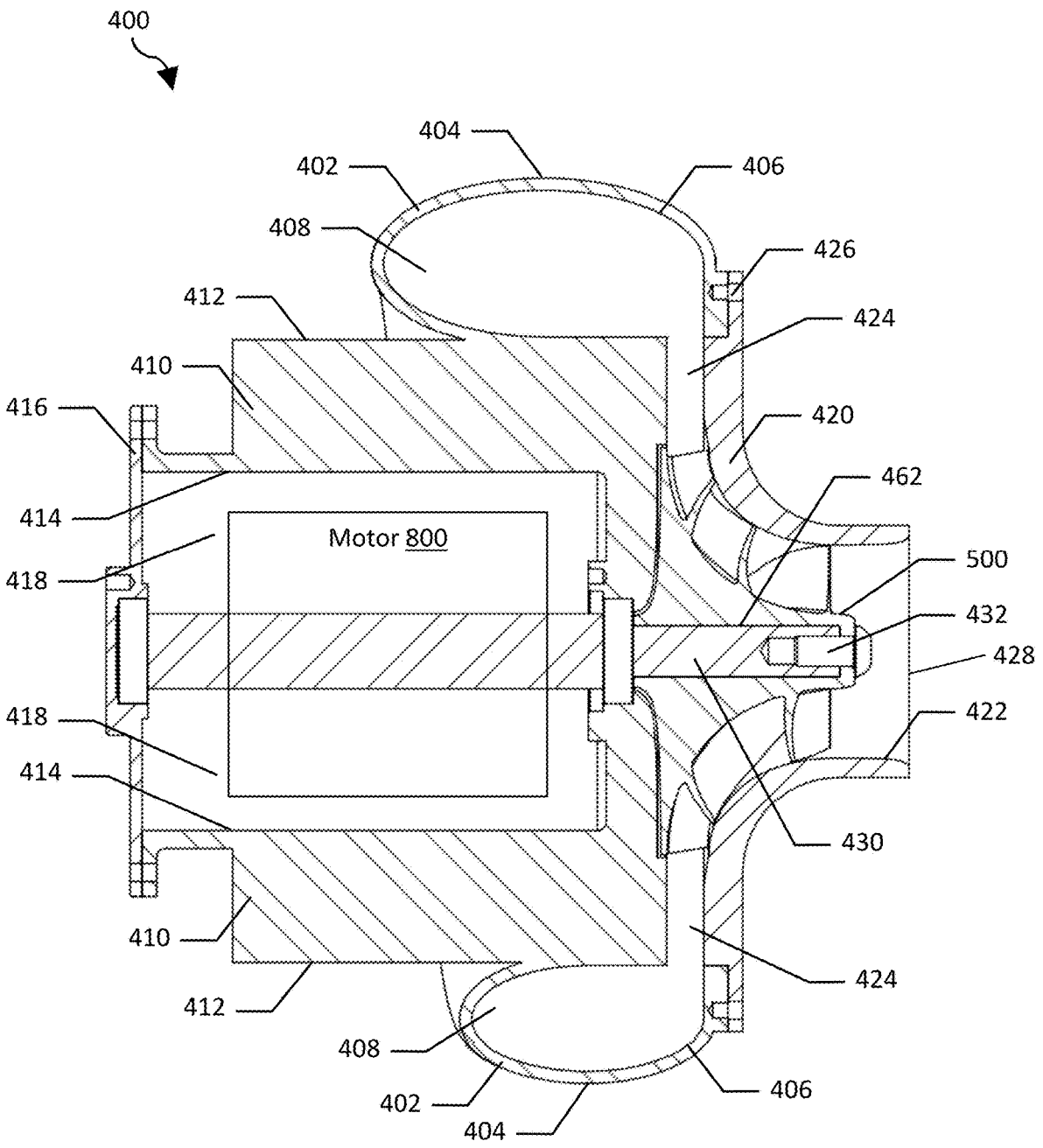
FIG. 4A is a side cross sectional views of a blower, according to various embodiments of the present disclosure.
Figure 4B:
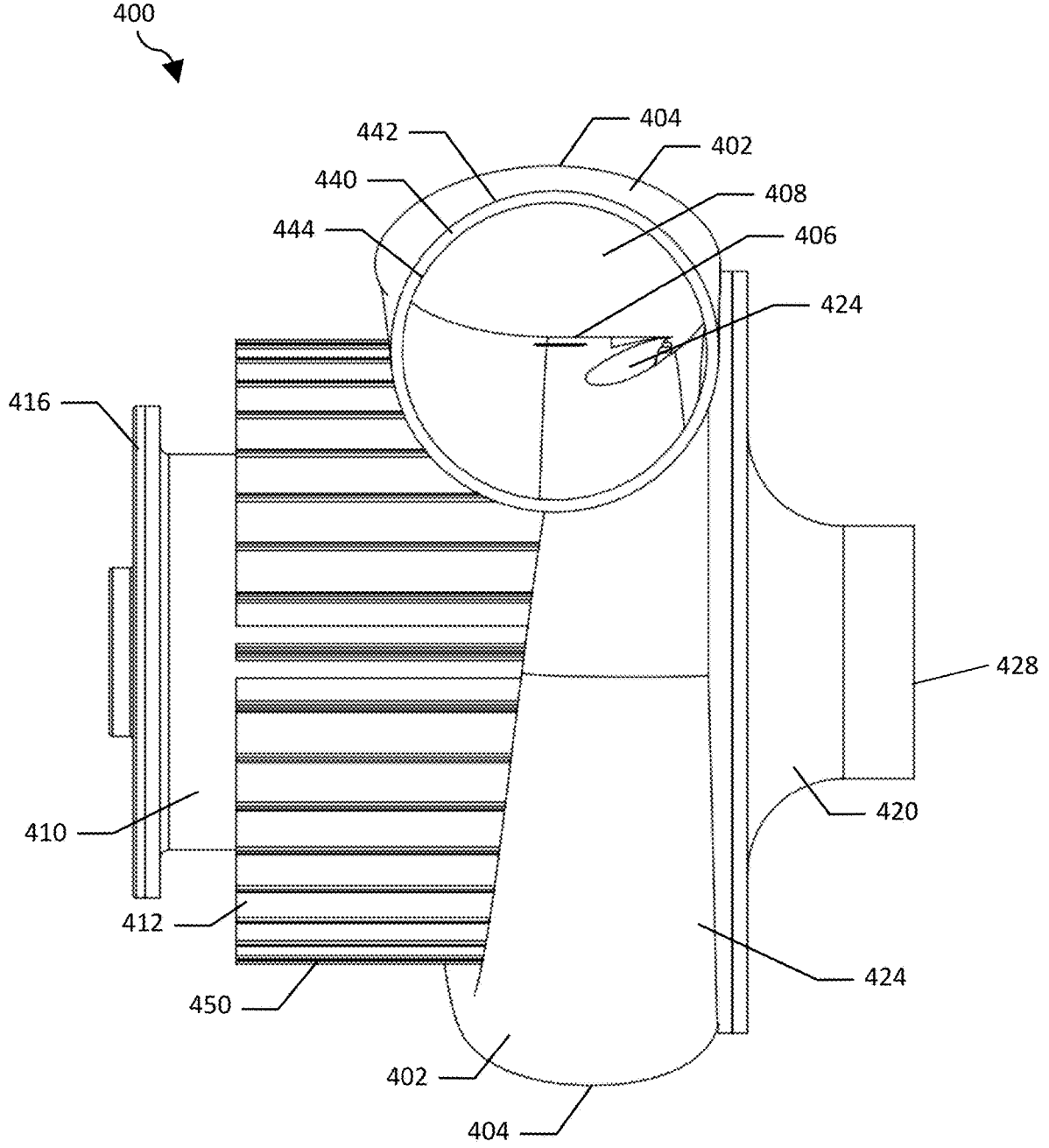
FIG. 4B is a front view of a blower, according to various embodiments of the present disclosure.
Figure 4C:
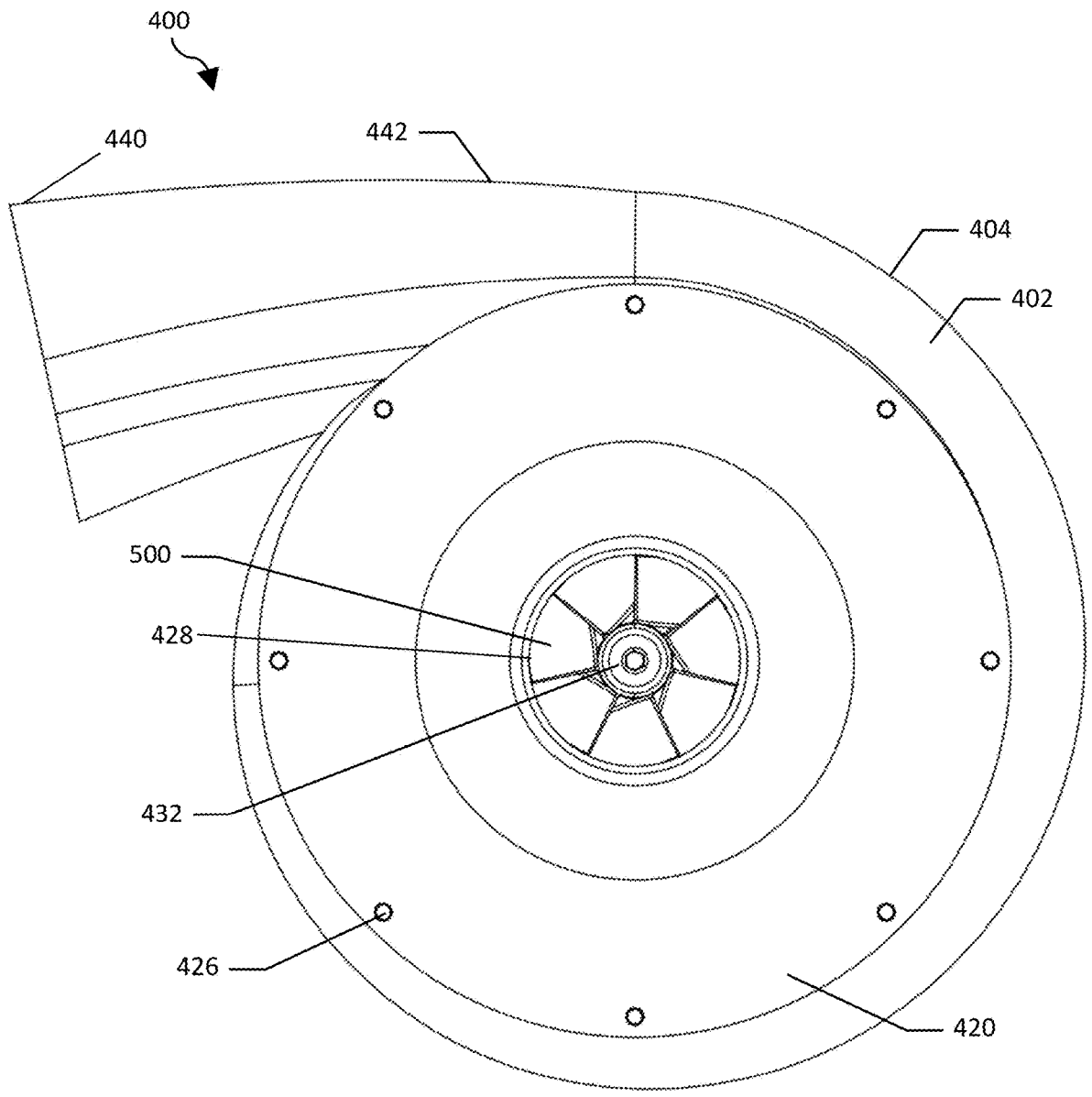
FIG. 4C is a side view of a blower, according to various embodiments of the present disclosure.
Figure 4D:
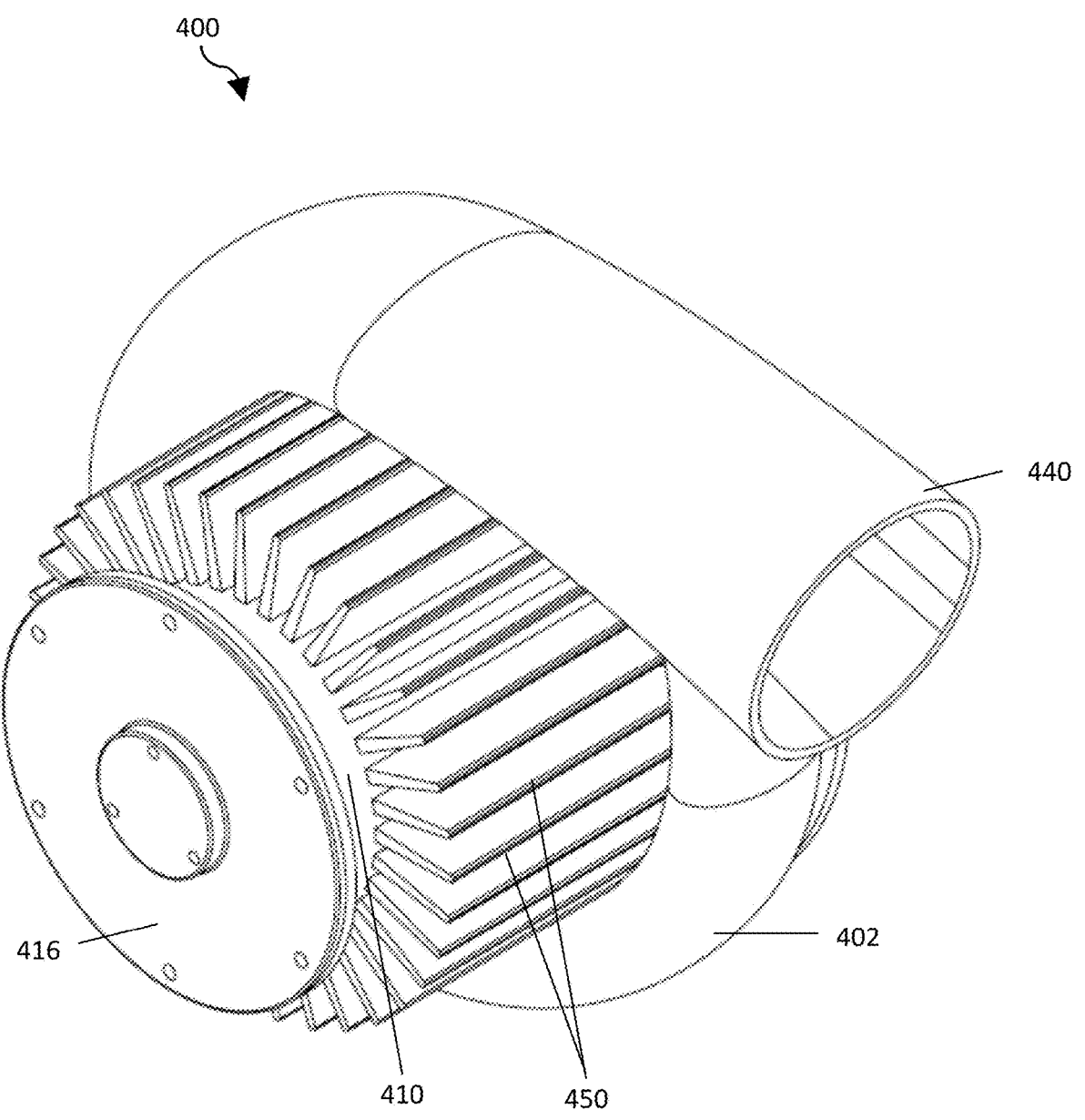
FIG. 4D is a perspective view of a blower, according to various embodiments of the present disclosure.

FIGS. 4A-4D illustrate an example of a blower 400 according various embodiments of the present disclosure. FIG. 4A is a side cross sectional views of the blower 400, FIG. 4B is a front view of the blower 400, FIG. 4C is a side view of the blower 400, and FIG. 4D is a perspective view of the blower. In various embodiments, the blower 400 may be formed of any number and combination of metals, alloys, and/or polymers. For example, any components of the blower 400 may be formed of aluminum and/or an aluminum alloy.

The blower 400 may include a fluid conveyance structure, referred to herein as a volute 402, and a motor housing 410, as shown in FIGS. 4A, 4B and 4D. In some embodiments, the volute 402 may be configured to convey air, exhaust gas, and/or fuel gas. The volute 402 may be formed in a curvilinear shape. In some embodiments shown in FIGS. 4A and 4C, the volute 402 may be disposed radially around at least a portion of a circumference of an impeller 500 (e.g., a circumferential edge 502 of an impeller 500 described below with reference to FIGS. 5A-5C), which may be disposed within the blower 400. For example, the volute 402 may be disposed radially around approximately 360° of the circumference of the impeller 500. In some embodiments, the volute 402 may be disposed radially around at least a portion of a volume the motor housing 410. For example, the volute 402 may be disposed radially around approximately 360° of at least a portion of the volume of the motor housing 430.

The volute 402 may include an outer surface 404 and an inner surface 406. The inner surface 406 may form a fluid conveyance channel 408 that may convey a fluid (e.g., a gas, such as air) from a volute inlet channel 424 to an outlet 440. The volute inlet channel 424 and the outlet 440 may be fluidly connected to the fluid conveyance channel 408. The fluid conveyance channel 408 formed by the inner surface 406 may have an elliptical cross-section with an aspect ratio greater than 2. For example, the fluid conveyance channel 408 formed by the inner surface 406 may have a high aspect ratio greater than 2, such as 2.1 to including 2.2, 2.3, 2.4, etc. to 3. As such, the volute 402 may have an internal elliptical cross-section equal to the elliptical cross-section of the fluid conveyance channel 408. For example, the volute 402 may have an internal elliptical cross-section may have a high aspect ratio greater than 2, such as 2.1 to 10, including 2.2, 2.3, 2.4, etc., to 3. The volute 402 may have an external cross-section formed by the outer surface 404 of any shape. In some embodiments, the external cross-section of the volute 402 may be an external elliptical cross-section formed by the outer surface 404 similar to the internal elliptical cross-section of the volute 402. The fluid conveyance channel 408 of the volute 402 may have a variable volume for which the volume may increase closer to the outlet 440. The inner surface 406 may be variably sized to increase the volume of the fluid conveyance channel 408 closer to the outlet 440. The inner surface 406 may be sized to maintain the internal elliptical cross-section of the volute 402 while increasing the volume of the fluid conveyance channel 408. In some embodiments, the inner surface 406 may be sized to maintain the internal elliptical cross-section of the volute 402 while maintaining the aspect ratio of the internal elliptical cross-section. In some embodiments, the inner surface 406 may be sized to maintain the internal elliptical cross-section of the volute 402 while varying the aspect ratio.

The motor housing 410 may include an outer surface 412, an inner surface 414, and a motor cavity 418 formed by the inner surface 414. The motor housing 410 may be configured to house a motor 800 in the motor cavity 418, as shown in FIG. 4A. The motor 800 may be configured to drive the impeller 500 via a motor shaft 430. The impeller 500 may be mounted directly on the motor shaft 430 to reduce the size and complexity of the blower. Operation of the motor 800 may generate heat and the motor housing 410 may function as a heat sink to dissipate the heat generated by the motor 800. In some embodiments, the motor housing 410 may include a radiator 450, such as a finned radiator having a plurality of heat sink fins, which may be integral to and or mounted to the outer surface 412. The radiator 450 may function in conjunction with the motor housing 410 as a heat sink to dissipate the heat generated by the motor 800. In some embodiments, the outer surface 412 may have a circular circumference.

In some embodiments, the volute 402 may be disposed in a manner in which at least a portion of the volute 402 overlaps the motor housing 410. For example, the volute 402 may overlap 20% or more of the motor housing 410, such as 20% to 100% of the motor housing 410, including approximately 40% to approximately 50% of the motor housing 410. As such, the volute 402 may be disposed substantially on an opposite side of the impeller 500 (e.g., on a motor 800 side of the impeller 500) compared to existing blower designs. For example, the volute 402 may have a portion that overlaps the volute inlet channel 424 and a portion that overlaps the motor housing 410. The portion of the volute 402 overlapping the motor housing 410 may include at least a portion of the outer surface 404 of the volute 402 and/or at least a portion of the inner surface 406 of the volute 402 in direct contact with the motor housing 410. For example, the portion of the volute 402 overlapping the motor housing 410 may include at least a portion of the outer surface 404 of the volute 402 disposed abutting the motor housing 410, such as the outer surface 412 and/or the radiator 450. In another example, the portion of the volute 402 overlapping the motor housing 410 may include at least a portion of the outer surface 404 of the volute 402 forming a portion of the outer surface 412 of the motor housing 410, such as the outer surface 412 and/or the radiator 450. In another example, the portion of the volute 402 overlapping the motor housing 410 may include at least a portion of the inner surface 406 of the volute 402 forming a portion of the outer surface 412 of the motor housing 410. The volute 402, having a high aspect ratio elliptical cross-section, may be wider along a major axis in a direction parallel to the motor shaft 430 than the volute 402 may be tall along a minor axis in a direction perpendicular to the motor shaft 430. For example, having a high aspect ratio greater than 2, the volute 402 may be more than 2 times wider, for example 2.1 to 10 times wider, including 2.2, 2.3, 2.4, etc. to 3 times wider, than the volute 402 may be tall. The higher the aspect ratio, the more of the volute may overlap the motor housing 410. The portion of the volute 402 that may overlap the motor housing 410 may be disposed radially around at least a portion of the radiator 450.

The volute 402 having an external elliptical cross-section may reduce the overall outer dimension of the blower 400 compared to existing blower designs having external circular cross-section (e.g., having an aspect ratio of 1). Higher aspect ratios of the of external elliptical cross-section of the volute 402 may produce smaller overall outer dimensions of the blower 400. For example, the overall outer dimensions of the blower 400 may be smaller in a dimension perpendicular to the motor shaft 430. A portion of the volute 402 overlapping a portion of the motor housing 410 may reduce the overall outer dimension of the blower 400 compared to existing blower designs for which a volute does not overlap a motor housing. Larger portions of the volute 402 overlapping larger portions of the motor housing 410 may produce smaller overall outer dimensions of the blower 400. For example, the overall outer dimensions of the blower 400 may be smaller in a dimension parallel with the motor shaft 430.

By overlapping the portion of the motor housing 410 with the portion of the volute 402, the volute may function as an active heat sink to cool the motor 800. The air and/or gas conveyed through the volute 402 fluid conveyance channel 408 may have a lower temperature than the heat from the motor 800 absorbed by the motor housing 410 and present at the portion of the motor housing 410 overlapped by the volute 402. In some embodiments, the absorbed motor heat present at the overlapped portion of the motor housing 410 may be absorbed by the volute 402 through the abutting portion of the outer surface 404 of the volute 402 and conducted through the volute 402 to the conveying air and/or gas by the inner surface 406 of the volute 402. For example, the absorbed motor heat present at the overlapped portion of the of the outer surface 412 of the motor housing 410 may be absorbed by the abutting portion of the outer surface 404 of the volute 402. For another example, the absorbed motor heat present at the overlapped portion of the of the radiator 450 of the motor housing 410 may be absorbed by the abutting portion of the outer surface 404 of the volute 402. In some embodiments, the absorbed motor heat present at the overlapped portion of the motor housing 410 may also be present and at the overlapping portion of the volute 402 and conducted to the conveying air and/or gas by the inner surface 406 of the volute 402. For example, the absorbed motor heat present at the overlapped portion of the of the outer surface 412 of the motor housing 410 may also be present at the portion of the inner surface 406 of the volute 402 forming the overlapped portion of the outer surface 412 of the motor housing 410. The heat conducted to the conveying air and/or gas may be removed from the blower 400 by the air and/or gas conveying out of the blower 400 via the volute 402 and the outlet 440. The heat sink benefits of the volute 402 may allow for omission of a typical cooling fan for the motor 800. For example, the heat sink benefits of the volute 402 combined with the function of the radiator 450 may allow for sufficient motor cooling to omit the typical cooling fan for the motor 800.

The embodiments for which the volute 402 abuts or forms a portion of the motor housing 410, the blower 400 functions as a hybrid heat sink for motor cooling. The high aspect ratio ellipse shape of volute 402 internal cross-section enables the volute 402 to contact or integrate with the motor housing 410 to a greater extent than lower aspect ratio designs, and may still allow for optimized aerodynamic performance. The forced convective heat transfer by relatively high velocity air and/or gas flow in the volute 402 carries away a majority of the heat conducted through the motor housing 410. The convective heat transfer through the motor housing 410, such as by the radiator 450 located on the outer surface 412 of the motor housing 410 may remove the rest of the heat generated by the motor 800. This hybrid heat sink may reduce the size, cost, and noise due to the omission of the cooling fan of the blower compared to existing blower designs.

The hybrid cooling of the motor 800 using volute 402 and the motor housing 410 provides good thermal management for the motor 800, carrying away the heat of the motor 800 downstream in the fuel cell system. The hybrid cooling reduces a thermal load in the motor housing 410 more efficiently compared to traditional methods using a cooling fan that leave all the heat dissipated from the motor 800 in and around the motor housing 410 and have to remove the heat from around the blower by using the cooling fan. Without the traditional cooling fan, the overall efficiency of the blower may be improved and the blower may contain less parts, which may increase reliability, lower cost, and smaller size.

In some alternative embodiments, the volute 402 may be disposed in a manner in which the volute 402 does not overlap the motor housing 410. As such, the volute 402 may be disposed substantially on a side of the impeller 406 (e.g., on an intake side of the impeller 406). For example, the volute 402 may have a portion that overlaps the volute inlet channel 424 and a portion that extends from the blower 400 away from the motor housing 410 in a direction parallel with the motor shaft 430. The volute 402 having the external elliptical cross-section may reduce the overall outer dimension of the blower 400 compared to existing blower designs having external circular cross-section (e.g., having am aspect ratio of 1). Higher aspect ratios of the of external elliptical cross-section of the volute 402 may produce smaller overall outer dimensions of the blower 400. For example, the overall outer dimensions of the blower 400 may be smaller in a dimension perpendicular to the motor shaft 430.

The outlet 440 may include an outer surface 442 and an inner surface 444. In some embodiments, the outlet 440 may be a portion of the blower 400 contiguous with the volute 402. For example, the outer surface 442 of the outlet 440 may be contiguous with the outer surface 404 of the volute 402 and the inner surface 444 of the outlet 440 may be contiguous with the inner surface 406 of the volute 402. In some embodiments, the outlet 440 may be integral with the volute 402. In some alternative embodiments, the outlet 440 may be a component fixed to blower 400 by a fixing component (not shown). For example, the fixing component may be a threaded fastener, a clip, a pin, a weld, an adhesive, etc. The outlet 440 may have a varyingly shaped and/or sized cross-section. An internal cross-section of the outlet 440 and the elliptical cross-section of the volute 402 may be substantially similar at an end of the outlet 440 and an end the volute 402 where the outlet 440 and the volute 402 are fluidly coupled. The internal cross-section of the outlet 440 may become increasingly circular toward an end of the outlet 440 distal from the end of the outlet 440 at which the outlet 440 is fluidly coupled to the volute 402. In some embodiments, the internal cross-section and/or an external cross-section of the outlet 440 may be sized and/or shaped to couple with an outlet conduit (not shown), such as a duct, pipe, or hose.

In some embodiments, an impeller shroud 420 may be fixably coupled to an impeller end of the blower 400, in which the impeller 500 may be mounted. For example, the impeller shroud 420 may be fixably coupled to the outer surface 404 of the volute 402. For example, the impeller shroud 420 may be fixably coupled to the blower 400 by at least one fixing component 426, such as a threaded fastener (e.g., a bolt), a pin, a clip, a weld, an adhesive, etc. The shroud 420 may include an inner surface 422 which, in part, may form a blower inlet channel 428 through the shroud 420, which may serve as an inlet for air and/or gas to the blower 400. The blower inlet channel 428 may be co-axial with the impeller 500. The shroud 420 and blower 400 may form the volute inlet channel 424 between the motor housing 410 and the inner surface 422 of the shroud 420. The volute inlet channel 424 may be fluidly coupled to the blower inlet channel 428 formed by the inner surface 422 of the shroud 420. Air and/or gas may be conveyed through the blower inlet channel 428 formed by the inner surface 422 of the shroud 420 and the volute inlet channel 424 to fluid conveyance channel 408 of the volute 402.

In some embodiments, the impeller 500 may be mounted co-axially and directly to the motor shaft 430, which may extend into the motor 800 and may be rotated by the motor 800. As shown in FIG. 4A, the motor shaft 430 may be disposed within a mounting channel 462 (i.e., axial opening) in the impeller 500. The impeller 500 may be fixed to the motor shaft 430 by a fixing component 432, such as a threaded fastener (e.g., bolt), a pin, a clip, etc. Directly mounting the impeller 500 to the motor shaft 430 may forego intermediate gears or other rotational motion transfer components of other mounting means between the motor 800 and the impeller 500. Directly mounting the impeller 500 to the motor shaft 430 may reduce motor shaft length without sacrificing aerodynamics and mechanical performance of the blower. The motor 800 may be a permanent magnetic motor. The air and/or gas may be conveyed through the blower inlet channel 428 formed by the inner surface 422 of the shroud 420, the volute inlet channel 424, the fluid conveyance channel 408 of the volute 402, and the outlet may be driven, at least in part, by the impeller 500.

In some embodiments, a motor cover 416 (in FIGS. 4A and 4B) may be fixably coupled to a motor end of the blower 400, at which the motor 800 may be mounted. For example, the impeller a motor cover 416 may be fixably coupled to the outer surface 412 of the motor housing 410. For example, the motor cover 416 may be fixably coupled to the blower 400 by at least one fixing component, such as a threaded fastener, a pin, a clip, a weld, an adhesive, etc.

Figure 5A:
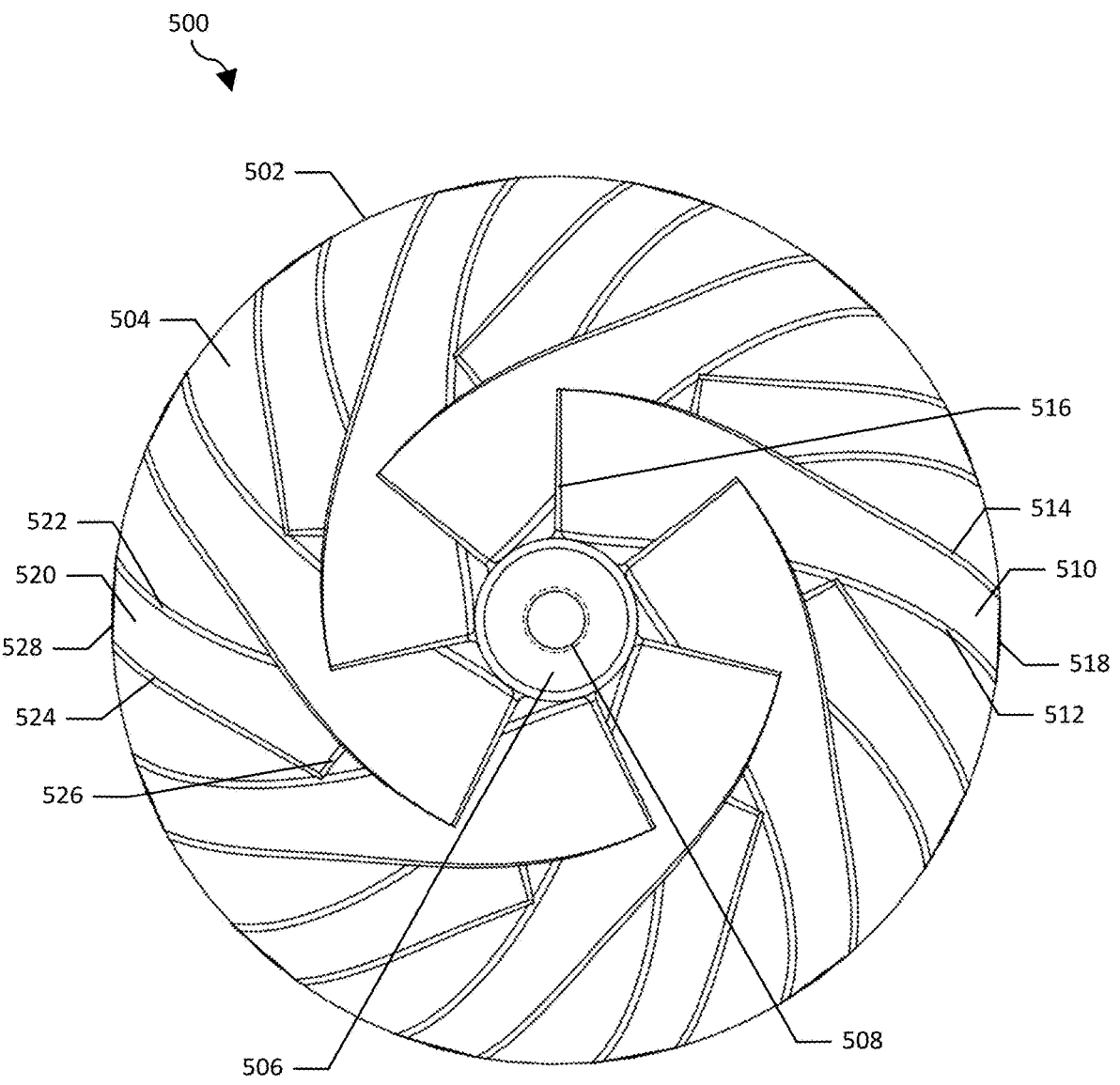
FIG. 5A is a front view of an impeller, according to various embodiments of the present disclosure.
Figure 5B:
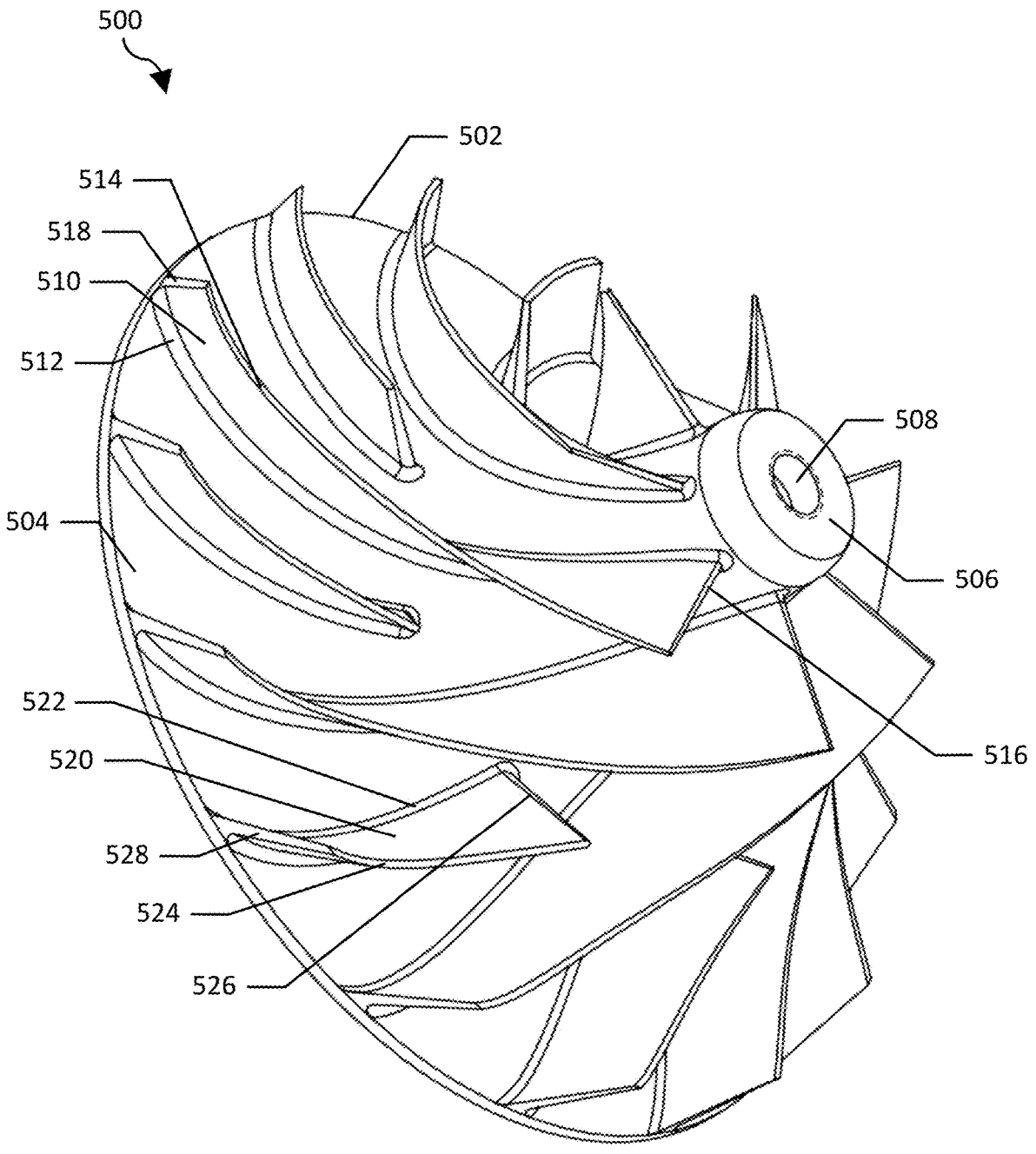
FIG. 5B is a perspective view of an impeller, according to various embodiments of the present disclosure.
Figure 5C:
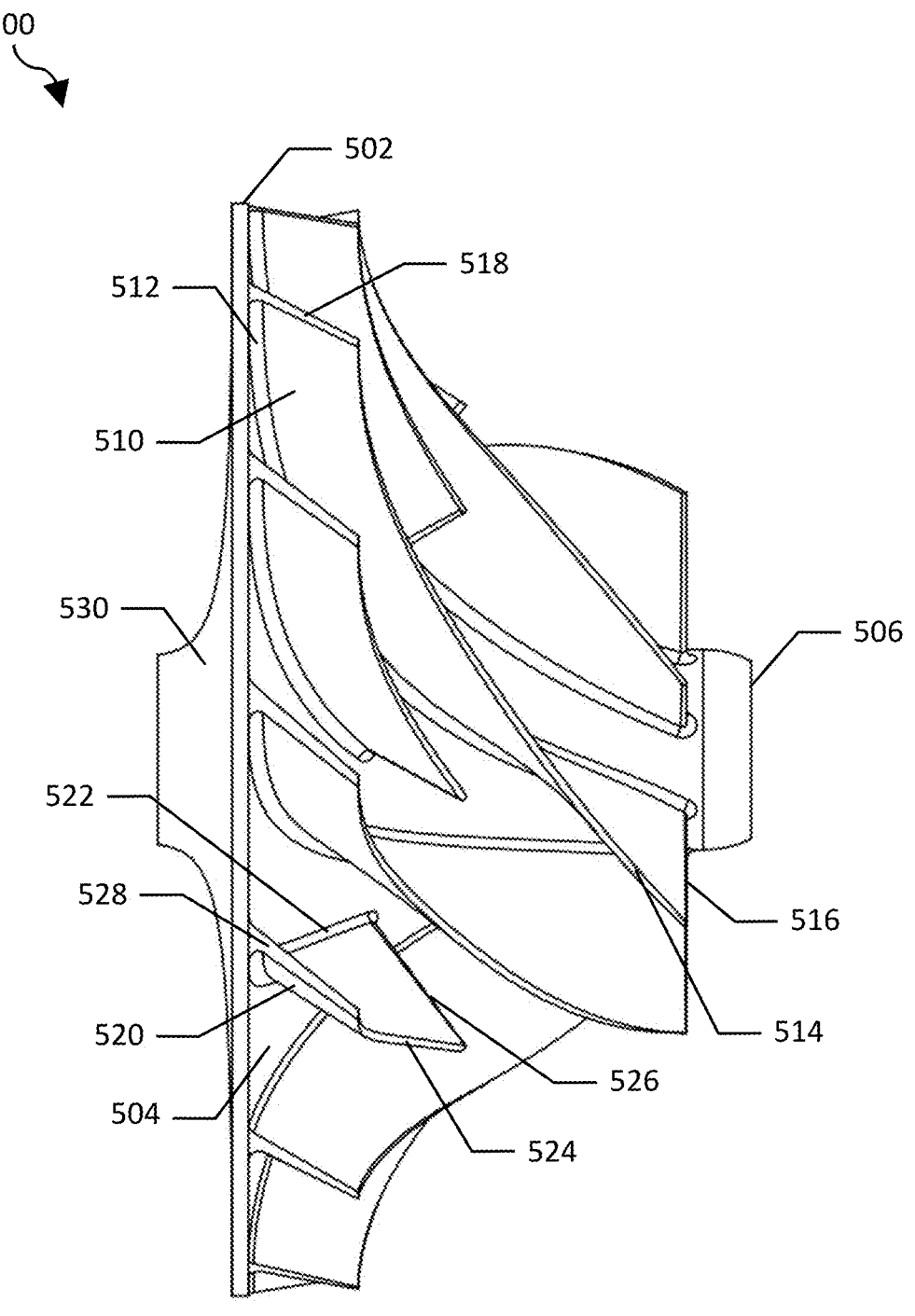
FIG. 5C is a side view of an impeller, according to various embodiments of the present disclosure.

FIGS. 5A-5C illustrate various views of an example of the impeller 500 having a combination of full blades 510 and splitter blades 520 according to various embodiments of the present disclosure. FIG. 5A is a front view of the impeller 500, FIG. 5B is a perspective view of the impeller 500, and FIG. 5C is a side view of the impeller 500. The impeller 500 may have any number and combination of full blades 510 and splitter blades 520. The number and combination of full blades 510 and splitter blades 520 may vary per application of the impeller 500. For example, the impeller 500 implemented in a blower, such as the CPOx blower 180 (e.g., air blower for the CPOx for system start-up), the system blower 182 (e.g., main air blower for providing air into the fuel cell stacks), and/or the anode recycle blower 184 which recycles the anode exhaust stream from the stacks into the fuel inlet stream. Alternatively, the blower may be used in a different system than the fuel cell system described above. The examples illustrated in FIGS. 5A-5C show the impeller 500 having a 1:1 ratio of seven full blades 510 and seven splitter blades 520. These examples do not limit the claims or description to the ratio and number of full blades 510 and splitter blades 520, which may be implemented in any number and combination. For example, the impeller 500 may have a 1:2 or a 2:1 ratio of full blades 510 and splitter blades 520. For another, example the impeller 500 may include as few as 2 of each or the full blades 510 and the splitter blades 520 and up to as many full blades 510 and splitter blades 520 for which the impeller 500 may be operational.

As shown in FIGS. 5A-5C, the impeller 500 may have a circumferential edge 502, a hub surface 504, a fastening surface 506, a mounting surface 508, and a base surface 530. The circumferential edge 502 may form an outer circumference of the impeller 500. The mounting surface 508 may extend through the impeller 500 forming a co-axial mounting channel (e.g., the mounting channel 462 shown in FIG. 4A) through the impeller 500. For example, the mounting surface 508 may extend between the hub surface 504 and the base surface 530 forming the mounting channel in both the hub surface 504 and the base surface 530. For another example, the mounting surface 508 may extend between the fastening surface 506 and the base surface 530 forming the mounting channel in the fastening surface 506, the hub surface 504, and the base surface 530. The impeller 500 shown in FIG. 5A is configured to rotate counter-clockwise when facing its hub surface 504.

The hub surface 504 may be disposed between the circumferential edge 502 and the fastening surface 506. The hub surface 504 may have a surface area that increases from the fastening surface 506 to the circumferential edge 502. In some embodiments, the hub surface 504 may be linear between the fastening surface 506 to the circumferential edge 502. For example, the hub surface 504 may have a conical shape that is linear between the fastening surface 506 and the circumferential edge 502. In some alternative embodiments, the hub surface 504 may be curvilinear between the fastening surface 506 to the circumferential edge 502. For example, the hub surface 504 may have a conical shape that is curved toward the mounting surface 508 between the fastening surface 506 and the circumferential edge 502. The base surface 530 may be disposed opposite the hub surface 504 between the circumferential edge 502 and the mounting surface 508. In some embodiments, the base surface 530 may be substantially planar between the circumferential edge 502 and the mounting surface 508. In some embodiments, the base surface 530 may have a conical shape that is linear between the circumferential edge 502 and the mounting surface 508. In some embodiments, the base surface 530 may have a conical shape that is curved toward the mounting surface 508 between the circumferential edge 502 and the mounting surface 508.

The full blades 510 may have a fillet 512, a top edge 514, a leading edge (e.g., root) 516, and a trailing edge 518. The splitter blades 520 may have a fillet 522, a top edge 524, a leading edge 526, and a trailing edge 528. In some embodiments, the blades 510, 520 may be portions of the impeller 500 contiguous with the with the hub surface 504 at the fillet 512, 522. For example, the fillet 512, 522 of the blades 510, 520 may be contiguous with the hub surface 504 of the impeller 500. For example, the impeller 500 and the blades 510, 520 may be formed as an integral, contiguous object, such as by casting, machining, molding, 3D printing, etc.

The leading edge 516 of the full blades 510 may be disposed at or near the fastening surface 506. The trailing edge 518 of the full blades 510 may be disposed at or near the circumferential edge 502. The top edge 514 of the full blades 510 may be disposed between the leading edge 516 and the trailing edge 518. A lean angle of the full blades 510 may be an angle between the full blades 510 and the hub surface 504 in a circumferential direction on the impeller 500 (e.g., in a direction of rotation of the impeller 500), examples of which are described further herein with reference to FIG. 6. In some embodiments, a lean angle of the full blades 510 at the trailing edge 518 may be a high lean angle that may be approximately 35° to approximately 45°, such as approximately 40°. In some embodiments, the lean angles along the full blades 510, such as between the leading edge 516 and the trailing edge 518 may vary linearly. In some embodiments, the lean angles along the full blades 510, such as between the leading edge 516 and the trailing edge 518 may vary nonlinearly. A back sweep angle of the full blades 510 may be angle between the full blades 510 and the hub surface 504 in a radial direction on the impeller 500 (e.g., in a direction of the circumferential edge 502 or of the fastening surface 506), examples of which are described further below with reference to FIG. 7. In some embodiments, a back sweep angle of the full blades 510 at the trailing edge 518 may be a high back sweep angle equal to or greater than approximately 45°, such as approximately 45° to approximately 65°, including approximately 50° to 60°. In some embodiments, the back sweep angles along the full blades 510, such as between the leading edge 516 and the trailing edge 518 may vary linearly. In some embodiments, the back sweep angles along the full blades 510, such as between the leading edge 516 and the trailing edge 518 may vary nonlinearly.

The splitter blades 520 may have a length between the leading edge 526 and the trailing edge 528 that is less than a length of the full blades 510 between the leading edge 516 and the trailing edge 518. For example, the length of splitter blades 520 may be approximately 25% to approximately 75% of the length of the full blades 510, such as 50%. The leading edge 526 of the splitter blades 520 may be disposed between the fastening surface 506 and the circumferential edge 502. The trailing edge 528 of the splitter blades 520 may be disposed at or near the circumferential edge 502. The top edge 524 of the splitter blades 520 may be disposed between the leading edge 526 and the trailing edge 528. A lean angle of the splitter blades 520 may be an angle between the splitter blades 520 and the hub surface 504 in a circumferential direction on the impeller 500 (e.g., in a direction of rotation of the impeller 500), examples of which are described further below with reference to FIG. 6. In some embodiments, a lean angle of the splitter blades 520 at the trailing edge 528 may be a high lean angle that may be approximately 35° to approximately 45°, such as approximately 40°. In some embodiments, the lean angles along the splitter blades 520, such as between the leading edge 526 and the trailing edge 528, may vary linearly. In some embodiments, the lean angles along the splitter blades 520, such as between the leading edge 526 and the trailing edge 528, may vary nonlinearly. A back sweep angle of the splitter blades 520 may be an angle between the splitter blades 520 and the hub surface 504 in a radial direction on the impeller 500 (e.g., in a direction of the circumferential edge 502 or of the fastening surface 506), examples of which are described further below with reference to FIG. 7. In some embodiments, a back sweep angle of the splitter blades 520 at the trailing edge 528 may be a high back sweep angle equal to or greater than approximately 45°, such as approximately 45° to approximately 65°, including approximately 50° to 60°. In some embodiments, the back sweep angles along the splitter blades 520, such as between the leading edge 526 and the trailing edge 528, may vary linearly. In some embodiments, the back sweep angles along the splitter blades 520, such as between the leading edge 526 and the trailing edge 528, may vary nonlinearly.

The impeller 500 may be a centrifugal blower impeller. The centrifugal blower impeller 500 may have a combination of full blades 510 and splitter blades 520. The blades 510, 520 may have high back swept angles at the trailing edge 518, 528, and the blades 510, 520 may have high lean angles at the trailing edge 518, 528, leaning the blades 510, 520 towards the rotating direction of the centrifugal blower impeller 500. These three geometric features may improve efficiency of the centrifugal blower impeller 500 compared to traditional impeller designs. In addition, the blades 510, 520 having a high lean angle toward the rotating direction of the centrifugal blower impeller 500 and the combination of full blades 510 and splitter blades 520 may reduce noise due to the gas flow through the impeller 500 compared to traditional impeller designs.

The combination of full blades 510 and splitter blades 520 having high back swept angles at the trailing edge 518, 528 and lean angles leaned towards the rotating direction at the trailing edge 518, 528 may provide improved efficiency across a whole operation range and improved noise reduction compared to traditional impeller designs. The combination of full blades 510 and splitter blades 520 may affect the dipole directivity characteristics of the air and/or gas flow driven by the centrifugal blower impeller 500, improving noise reduction compared to traditional impeller designs. For example, the combination of full blades 510 and splitter blades 520 may affect the dipole directivity characteristics of the air and/or gas flow creating larger regions of destructive interference than traditional impeller designs with equal length blades.

In addition, the combination of full blades 510 and splitter blades 520 may reduce blockage by the centrifugal blower impeller 500 at a blower inlet (e.g., blower inlet channel) 428 shown in FIGS. 4A and 4C, compared to traditional impeller designs, as a result of the leading edge 526 of the splitter blades 520 not extending to the same position on the hub surface 504 as the leading edge 516 of the full blades 510. Less blockage at the centrifugal blower impeller leading edge (e.g., the position of the leading edge 516 of the full blades 510 on the hub surface 504) resulting from the combination of full blades 510 and splitter blades 520 may allow for a smaller shroud 420 radius for a required flow rate. Thus, the impeller leading edge velocity may be reduced, which reduces loss and noise compared to traditional impeller designs. Traditional impeller designs may have greater blockage than the impeller 500 by employing more blades at the blower inlet. Thus, more blade surface area is present at a leading edge/blower inlet of the traditional impeller designs. The impeller 500 may be configured for varied flow rates and/or impeller speeds (e.g., impeller leading edge velocity), including different constant and/or variable flow rates and impeller speeds, for air and/or different gasses, including different fuels (e.g., bio-gas) and/or exhaust. For example, if the fuel cell system shown in FIG. 3 operates on natural gas or methane as fuel, then the impeller 500 may operate at a relatively high speed. In contrast, if the fuel cell system shown in FIG. 3 operates on biogas as fuel, then the impeller 500 may operate at a relatively low speed which is lower than the high speed. If the fuel cell system shown in FIG. 3 operates on a mixture of biogas and natural gas (or methane) as fuel, then the impeller 500 may operate at an intermediate speed which us higher than the relatively low speed but lower than the high speed.

The blades 510, 520 having trailing edges 518, 528 with high lean angles may cause a wake flow from the centrifugal blower impeller 500 to pass a downstream component, such as the volute tongue of a blower 400 with less intensity, which may improve noise compared to traditional impeller designs without high lean angles at trailing edges. For example, the timing of the wake flow from the blades 510, 520 having high lean angles passing a downstream component may result in less constructive interference of the wake flow, reducing the intensity of the wake flow that passes the downstream component. The blades 510, 520 having trailing edges 518, 528 with high back swept angles may weaken fluctuation intensity of a noise source, such as the wake flow, which may also reduce noise compared to traditional impeller designs without high back swept angles at trailing edges.

The fastening surface 506 may be configured to be used in concert with a fixing component (e.g., fixing component 432 in FIGS. 4A and 4C) to fixably mount the impeller 500 to a motor shaft (e.g., motor shaft 430 in FIG. 4A). The motor shaft 430 may extend through the base surface 530 and the hub surface 504 via the mounting channel 462 formed by the mounting surface 508. In some embodiments, the motor shaft may extend into or through the fastening surface 506 via the mounting channel 462 formed by the mounting surface 508.

Figure 6:
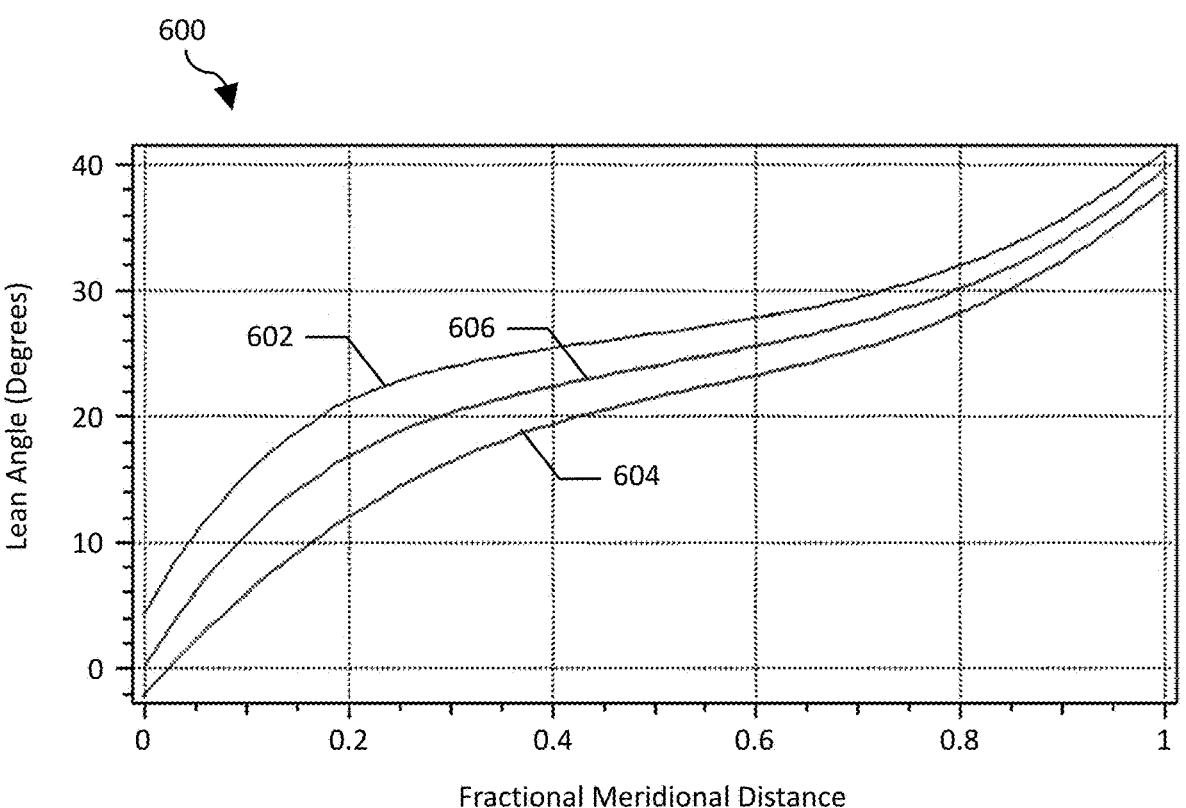
FIG. 6 is a graphical plot diagram of lean angles of a blade of an impeller of FIGS. 5A-5C, according to various embodiments of the present disclosure.

FIG. 6 illustrates a plot diagram 600 of lean angles of a blade (e.g., vane), such as a full blade 510 or splitter blade 520 in FIGS. 5A-5C of the impeller 500, according to various embodiments of the present disclosure. The plot diagram 600 plots comparisons of a lean angle in a rotating direction of the impeller and a fractional meridional distance, which may be a point on the impeller (e.g., on the hub surface 504 in FIGS. 5A-5C) between a 0 distance and a 1 distance. In some embodiments, the 0 distance may be at a fastening surface of the impeller (e.g., fastening surface 506 in FIGS. 5A-5C). In some embodiments, the 0 distance may be at a leading edge of the blade (e.g., root or leading edge 516 for the full blade 510, or root or leading edge 526 for the splitter blade 520 in FIGS. 5A-5C). In some embodiments, the 1 distance may be at a circumferential edge of the impeller (e.g., circumferential edge 502 in FIGS. 5A-5C). In some embodiments, the 1 distance may be at a trailing edge of the blade (e.g., trailing edge 518 for the full blade 510 and trailing edge 528 for the splitter blade 520 in FIGS. 5A-5C).

The plot diagram 600 includes a plot 602 of the lean angles of a pressure side of a blade (e.g., a side of the blade facing the rotation direction of the impeller), a plot 606 of the lean angles of a suction side of the blade (e.g., a side of the blade facing opposite of the rotation direction of the impeller), and a plot 604 of a mean of the plots 602, 606. In the example illustrated in FIG. 6, the plots 602, 604, 606 show that the lean angles of the blade may generally increase as the fractional meridional distance increases. The plots 602, 604, 606 show that the lean angles of the blade may increase nonlinearly. At the 0 distance, the mean lean angles of the blade may be approximately 0°. For example, the mean lean angle of the blade may be approximately 0°, the lean angle of the blade on the pressure side may be approximately 4°, and the lean angle of the blade on the suction side may be approximately −2°. At the 1 distance, the mean lean angle of the blade may be approximately 40°. For example, the mean lean angle of the blade may be approximately 40°, the lean angle of the blade on the pressure side may be approximately 41°, and the lean angle of the blade on the suction side may be approximately 38°.

Figure 7:
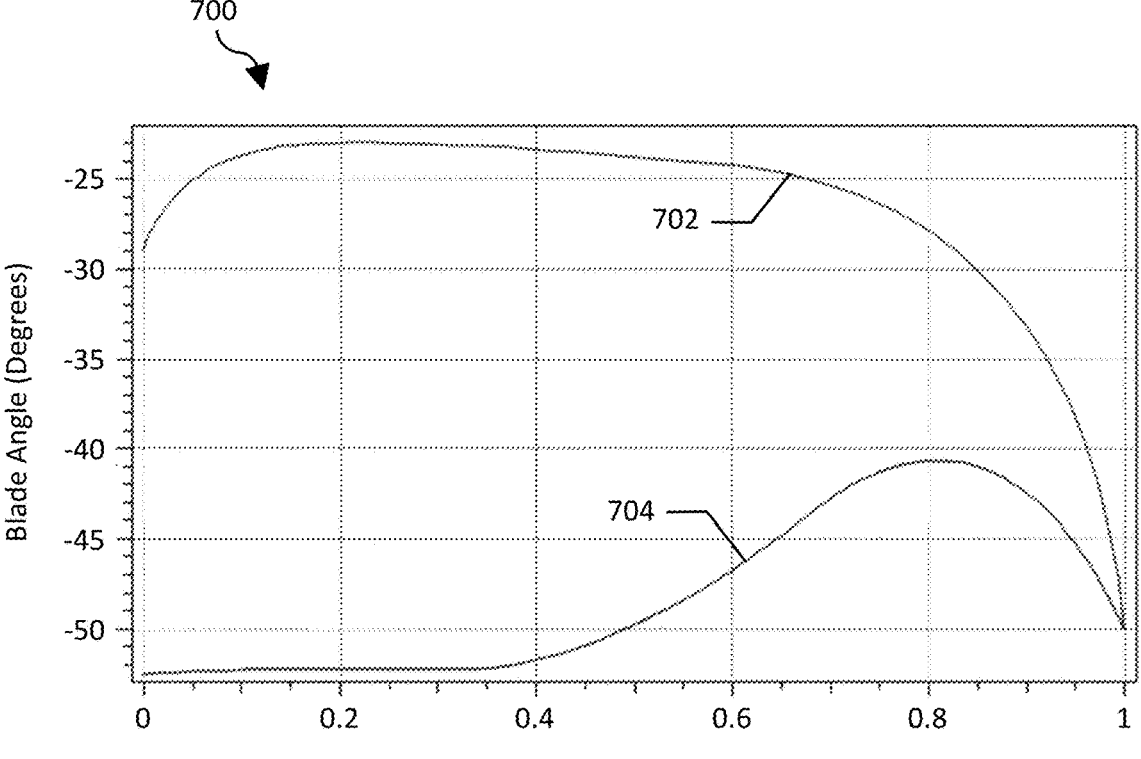
FIG. 7 is a graphical plot diagram of back sweep angles of a blade of an impeller of FIGS. 5A-5C, according to various embodiments of the present disclosure.

FIG. 7 illustrates a plot diagram 700 of blade angles of a blade (e.g., full blade 510) of an impeller (e.g., impeller 500 in FIGS. 5A-5C), according to various embodiments of the present disclosure. The plot diagram 700 plots comparisons of a blade angles and a fractional meridional distance, which may be a point on the impeller (e.g., on the hub surface 504 in FIGS. 5A-5C) between a 0 distance and a 1 distance. In some embodiments, the 0 distance may be at a fastening surface of the impeller (e.g., fastening surface 506 in FIGS. 5A-5C). In some embodiments, the 0 distance may be at a leading edge of the blade (e.g., leading edge 516 for the full blade 510 in FIGS. 5A-5C). In some embodiments, the 1 distance may be at a circumferential edge of the impeller (e.g., circumferential edge 502 in FIGS. in FIGS. 5A-5C). In some embodiments, the 1 distance may be at a trailing edge of the blade (e.g., trailing edge 518 for the full blade 510 in FIGS. 5A-5C).

The plot diagram 700 includes a plot 702 of the blade angles a full blade 510 at a hub surface (e.g., hub surface 504 in FIGS. 5A-5C) and a plot 704 of the blade angles of the full blade 510 at a top edge (top edge 514 in FIGS. 5A-5C). In one embodiment, the absolute value of the blade angles of the full blade 510 at the top edge may be higher than the absolute value of the blade angles of the full blade 510 at the hub surface except at the trailing edge 518 of the blade 510, at which the absolute value of the blade angles may be equal.

In the example illustrated in FIG. 7, the plots 702, 704 show that the blade angles at a trailing edge 518 of the full blade 510 may be back sweep angles, including at the hub surface and the top edge. The plots 702, 704 show that the absolute value of the back sweep angles of the blade may generally be high approaching and at the 1 distance (i.e., at the circumferential surface 502 of the impeller). For example, the back sweep angles at the 1 distance may be approximately −50°. The plots 702, 704 show that the angles of the blade may generally increase most rapidly between approximately the 0.8 distance and the 1 distance. In other words, the angles of the blade may be high approaching and at the trailing edge.

The plots 702, 704 show that the blade angles of the blade may vary nonlinearly. The plot 702 shows that approaching and at the 0 distance, the blade angle of the full blade 510 at the hub surface may be higher than blade angles of 0.2 to 0.7 distances (i.e., the distances between approaching and at the 0 distance and distances approaching and at the 1 distance), and not as high angles of the full blade 510 approaching and at the 1 distance. The plot 704 shows that approaching and at approximately the 0.5 distance the blade angle of the full blade 510 at the top edge may be higher than blade angles of distances between approaching and at the 0.5 distance and approaching and at the 1 distance, and approximately as high as sweep back angles of the full blade 510 approaching and at the 1 distance.

In some embodiments, the descriptions of the diagram 700 and the plots 702, 704 may similarly describe blade angles for a splitter blade 520, except that the plot would start at a value greater than 0, such as 0.5, instead of at 0.

Performance of a blower (e.g., blower 400 shown in FIGS. 4A-4D) and a splitter blade impeller (e.g., impeller 500 shown in FIGS. 5A-5C) may provide significantly higher efficiency, improved heat transfer away from the motor, a wider operation range, a larger capacity, and run at lower speeds compared to a similar sized conventional blower. The splitter blade impeller features may also reduce the noise level of the blower. Thus, the blower may provide a significantly higher efficiency across a whole operation range and may be able to achieve a same flow rate and pressure rise at much lower operating speed than the prior art blowers.

Motor Cooling

Air-cooled permanent magnet (PM) motors used to drive a blower typically employ sealed grease-lubricated ball bearings. It is challenging to effectively cool these bearings to extend its service life and improve reliability, especially at high operating speeds and temperatures and compact enclosures. In traditional motor designs, there is no or little dedicated cooling mechanism applied within the motor housing. For example, some conventional designs include a fan attached to the back of the motor. However, such a configuration does not provide a sufficient amount of bearing cooling, especially to the front bearing, which bears a larger load. The failure of bearings due to overheating is one of the major causes of blower malfunction and/or failure.

Figure 8A:
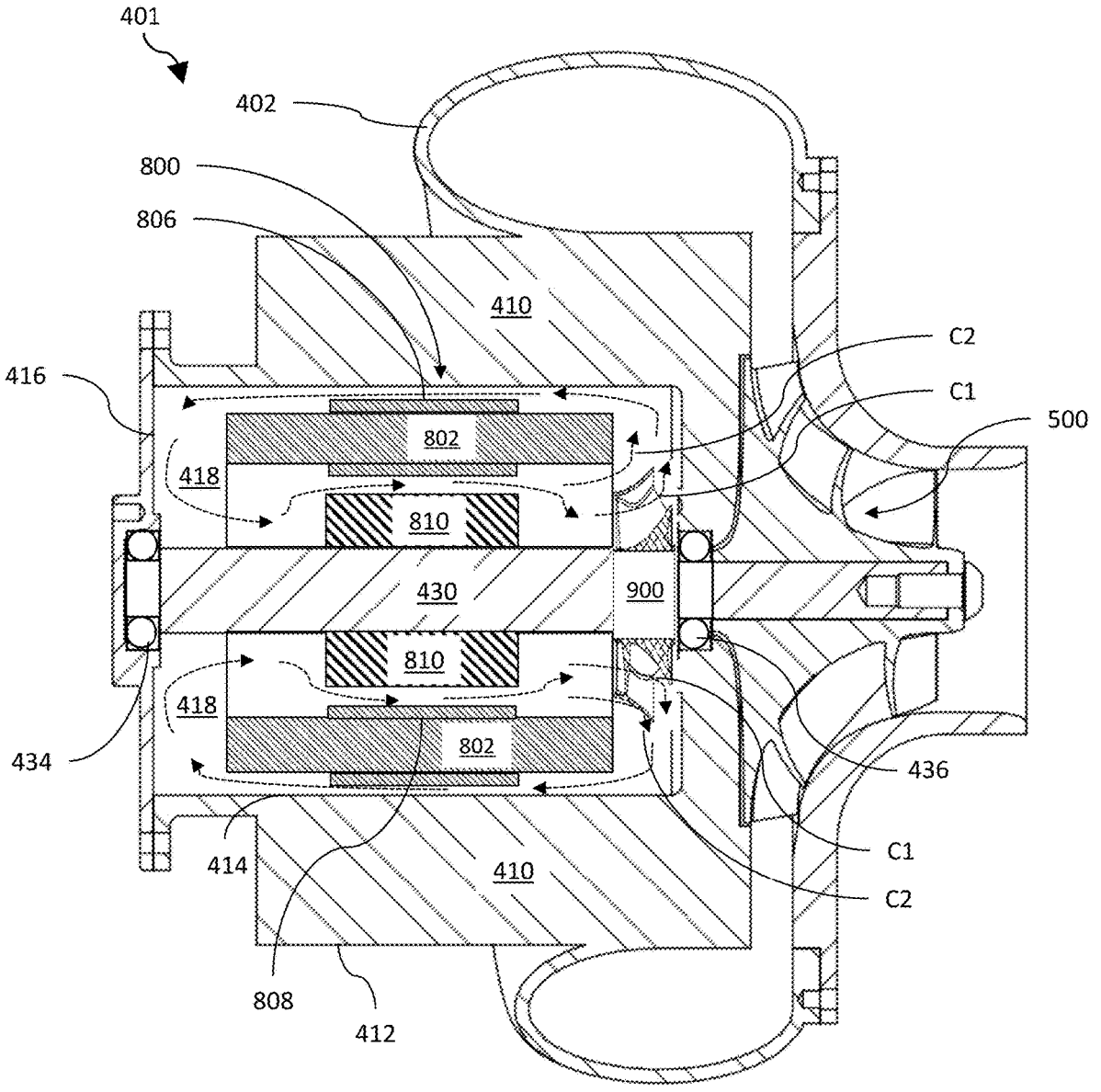
FIG. 8A is a cross-sectional view of a blower 401 including blower cooling features, according to various embodiments of the present disclosure.
Figure 8B:
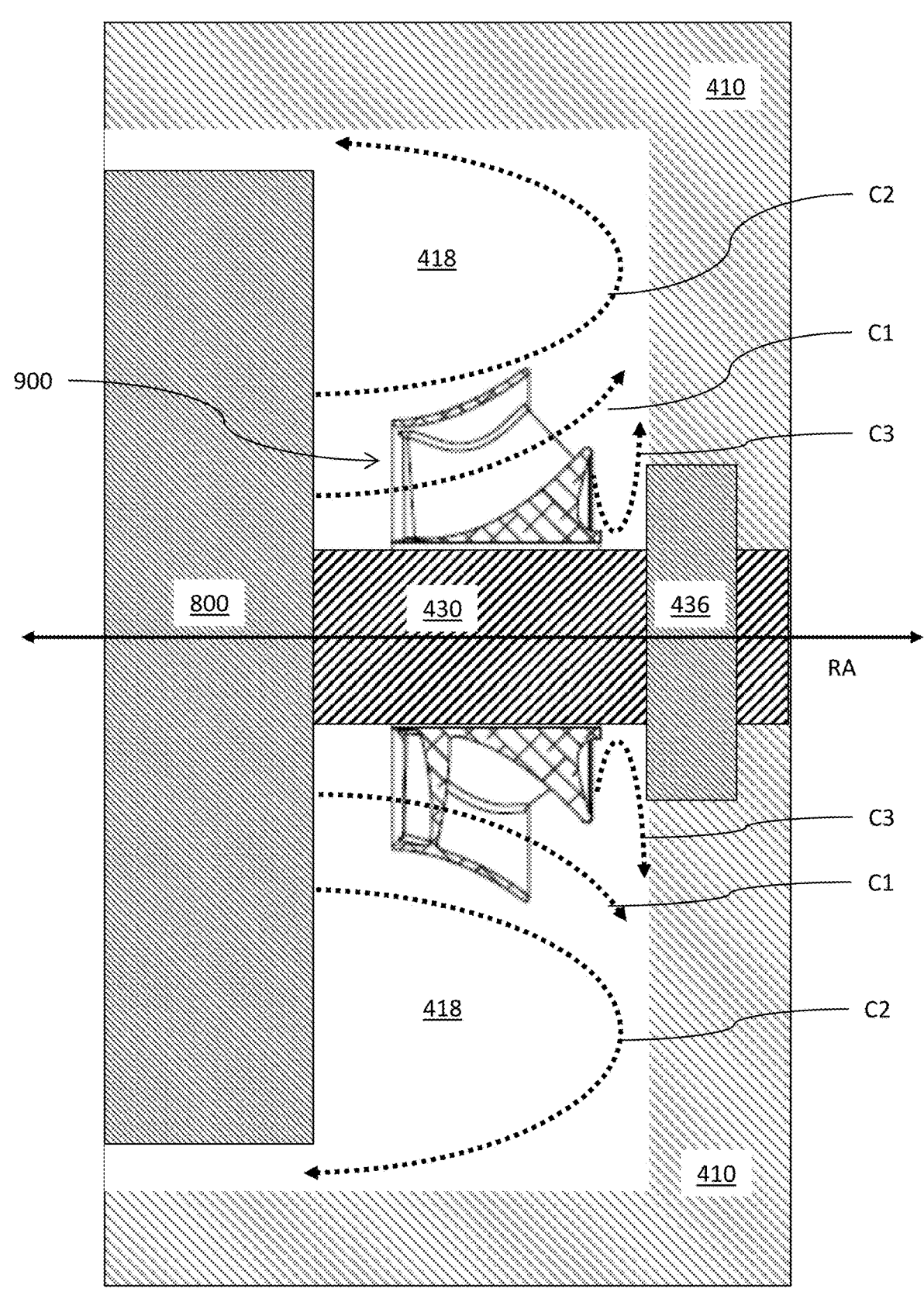
FIG. 8B is an enlarged view of a portion of FIG. 8A.

FIG. 8A is a cross-sectional view of a blower 401 having blower cooling features, according to various embodiments of the present disclosure. FIG. 8B is an enlarged view of a portion of FIG. 8A. The blower 401 may include similar components to the blower 400 of FIGS. 4A-4D. Accordingly, only the differences there between will be described in detail.

Referring to FIGS. 8A and 8B, the blower 401 may include a volute 402, a motor housing 410, a motor cover 416, a centrifugal impeller 500, a motor 800, and a mixed flow impeller 900. In some embodiments, the volute 402 may be configured to convey air, exhaust gas (e.g., fuel exhaust from a fuel cell stack), and/or fuel gas (e.g., a fuel inlet stream). The volute 402 may be formed in a curvilinear shape.

The motor housing 410 may include an outer surface 412, an inner surface 414, and a motor cavity 418 at least partially defined by the inner surface 414. In some embodiments, the motor cover 416 may be coupled to the motor housing 410. For example, the motor cover 416 may be coupled to the blower 400 by at least one fixing component, such as a threaded fastener, a pin, a clip, a weld, an adhesive, etc.

The motor 800 may be disposed in the motor cavity 418. The motor 800 may be configured to drive a motor shaft 430 that extends through the motor housing 410. In particular, the motor shaft 430 may be mounted on first and second bearings 434, 436 located on opposing sides of the motor 800 in the motor housing 410. The first and second bearings 434, 436 may be located in the motor cover 416 and in an opposing sidewall of the housing 410. A centrifugal impeller 500 may be mounted directly on the motor shaft 430, outside of the motor housing 410. The centrifugal impeller 500 is in fluid communication with the volute 402 to centrifugally move a fluid (e.g., air or fuel exhaust) through the volute 402.

The motor 800 may include a stator 802 and a rotor 810 disposed inside of the stator 802 and mounted to the motor shaft 430. The stator 802 may include a set of magnets and the rotor 810 may include an armature. In the alternative, the rotor 810 may include a set of magnets and the stator 802 may include an armature. The stator 802 may optionally include a first protrusion 806 that extends toward the motor housing 410 from the outer surface of the stator 802, and a second protrusion 808 that extends toward the rotor 810 from an inner surface of the stator 802.

Operation of the motor 800 generates heat. The motor housing 410 may function as a heat sink to dissipate the heat generated by the motor 800. In some embodiments, the motor housing 410 may include a radiator 450 (see FIG. 4D), such as a finned radiator having a plurality of heat sink fins, which may be integral to and or mounted to the outer surface 412 of the motor housing 410. The radiator 450 may function in conjunction with the motor housing 410 as a heat sink to dissipate the heat generated by the motor 800.

The mixed flow impeller 900 is located inside the motor housing 410 and is not in fluid communication with the volute 402. The mixed flow impeller 900 may be mounted co-axially and directly to the motor shaft 430, between the motor 800 and the second bearing 436. The second bearing 436 is located on the volute 402 side of the motor housing 410 (i.e., between the rotor 810 and the centrifugal impeller 500. However, in some embodiments the mixed flow impeller 900 may alternatively be disposed on the motor shaft 430 adjacent to the first bearing 434 (i.e., located adjacent to the cover 416 distal from the volute 402). In other embodiments, the blower 401 may include the first mixed flow impeller 900 as shown, and an additional second mixed flow impeller (shown in FIG. 11) disposed adjacent to the first bearing 434.

Operating the motor 800 to rotate the motor shaft 430 results in the rotation of the mixed flow impeller 900. The rotation of the mixed flow impeller 900 causes air to flow in a first direction through the motor 800 and in an opposing second direction between the motor 800 and the motor housing 410, as shown by the dashed arrows in FIGS. 8A and 8B. In particular, the mixed flow impeller 900 may pull air into a first side of the motor 800 adjacent to the motor cover 416 and into the space between the rotor 810 and the stator 802. The air then flows through the between the rotor 810 and the stator 802, before exiting an opposing second end of the motor 800 adjacent to the mixed flow impeller 900. The mixed flow impeller 900 then directs at least a portion of the air at a direction between axial and centrifugal onto the side of the motor housing 410 above and below the second bearing 436 to indirectly cool the second bearing 436 without impacting the second bearing directly. This reduces the drying out of the grease in the second bearing 436 while still cooling the second bearing 436. After impacting the side of the motor housing 410, the air then flows in the opposite direction between the stator 802 and the motor housing 410 toward the motor cover 416, and returns to the first end of the motor 800.

In some embodiments, the air exiting the second end (i.e., the end adjacent to the volute 402 and the centrifugal impeller 500) of the motor 800 may be divided into a first current (i.e., first air stream) C1 and a second current (i.e., second air stream) C2. The first current C1 may be pulled through the mixed flow impeller 900 and forced into the motor cavity 418 by the mixed flow impeller 900. The second current C2 may be induced to flow through the mixed flow impeller 900 and the motor cavity 418 onto the sidewall at the second end of the motor housing 410 as described above, due to the air circulation within the motor housing 410. The first current C1 and the second current C2 may be combined in the motor cavity 418 before returning to the first end of the motor 800 by passing between the stator 802 and the motor housing 410.

The first current C1 may be generated by mixed axial and centrifugal forces imparted by the mixed flow impeller 900. In contrast, the centrifugal impeller 500 may generate fluid flow using primarily centrifugal forces. The first current C1 may exit the mixed flow impeller 900 at an angle ranging from about 30° to about 60°, such as from about 40° to about 50°, or about 45°, with respect to a rotational axis RA of the mixed flow impeller 900 and/or the motor shaft 430.

The mixed flow impeller 900 may also induce an optional third current C3 of air that flows between the mixed flow impeller 900 and the second bearing 436, as shown in FIG. 8B. The third current C3 may result in additional cooling of the second bearing 436. In particular, the second bearing 436 may be subjected to a higher load and associated heat generation than the first bearing 434, do due the proximity of the second bearing 436 to the centrifugal impeller 500. As such, locating the mixed flow impeller 900 adjacent to the second bearing 436 may beneficially provide increased cooling of the second bearing 436. In some embodiments, the third current C3 may have a lower mass flow rate than the first current C1 and/or the second current C2, in order to prevent excessive drying of the lubricant (e.g., grease) of the second bearing 436.

In some embodiments, the stator 802 may include an outer protrusion 806 that extends from an outer surface of the stator 802 toward the motor housing 410 and an inner protrusion 808 that extends from an inner surface of the stator 802 toward the rotor 810. The outer protrusion 806 may be configured to generate a Venturi effect between the stator 802 and the motor housing 410. Similarly, the inner protrusion 808 may be configured to generate a Venturi effect between the stator 802 and the rotor 810. Accordingly, the protrusions 806, 808 may be configured to locally increase the rate of air flow into the motor cavity 418 adjacent to a portion of the stator 802 that receives a majority of heat that is generated by the rotor 810.

Figure 9A:
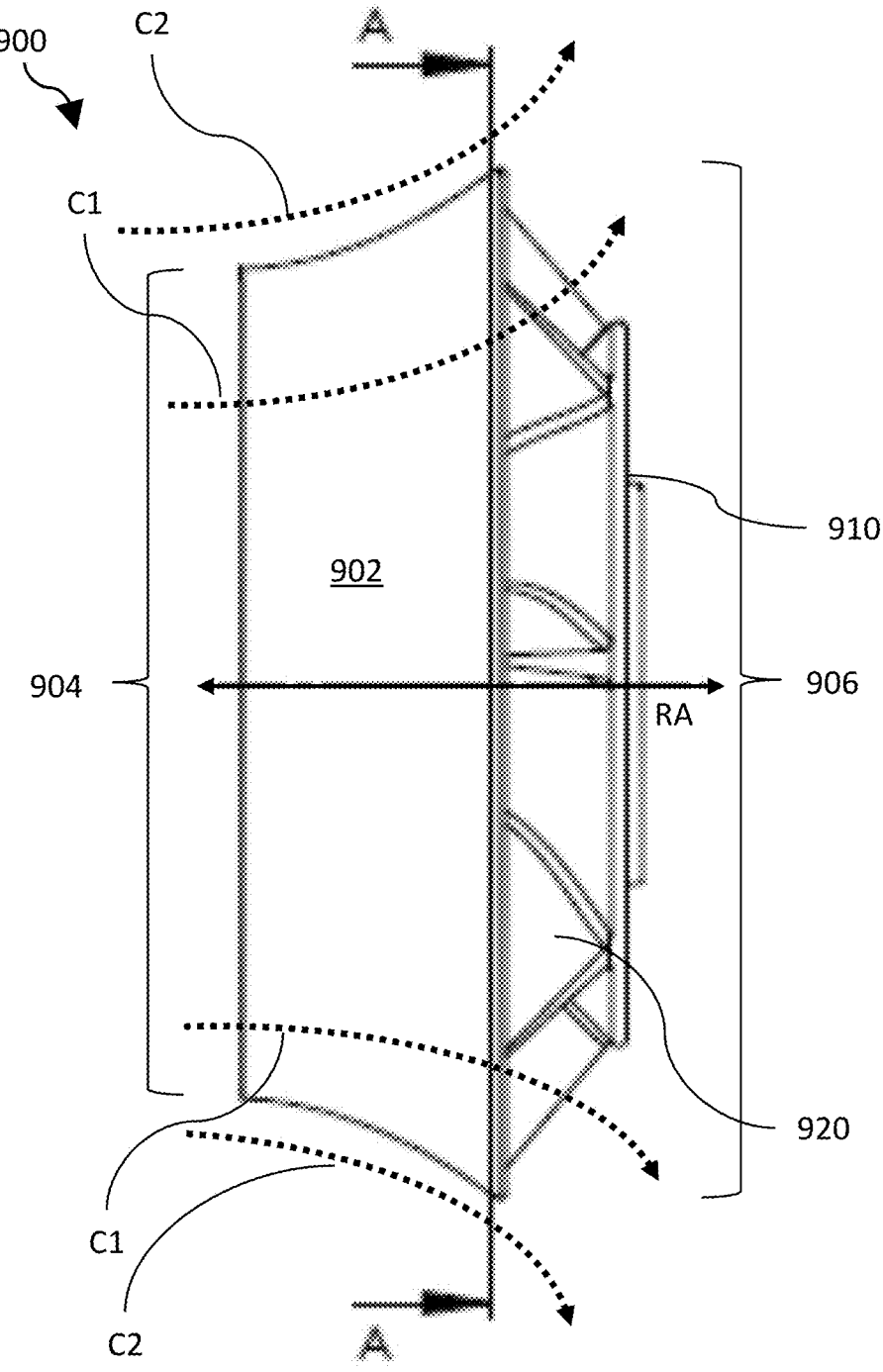
FIG. 9A is top view of a mixed flow impeller, according to various embodiments of the present disclosure.
Figure 9B:
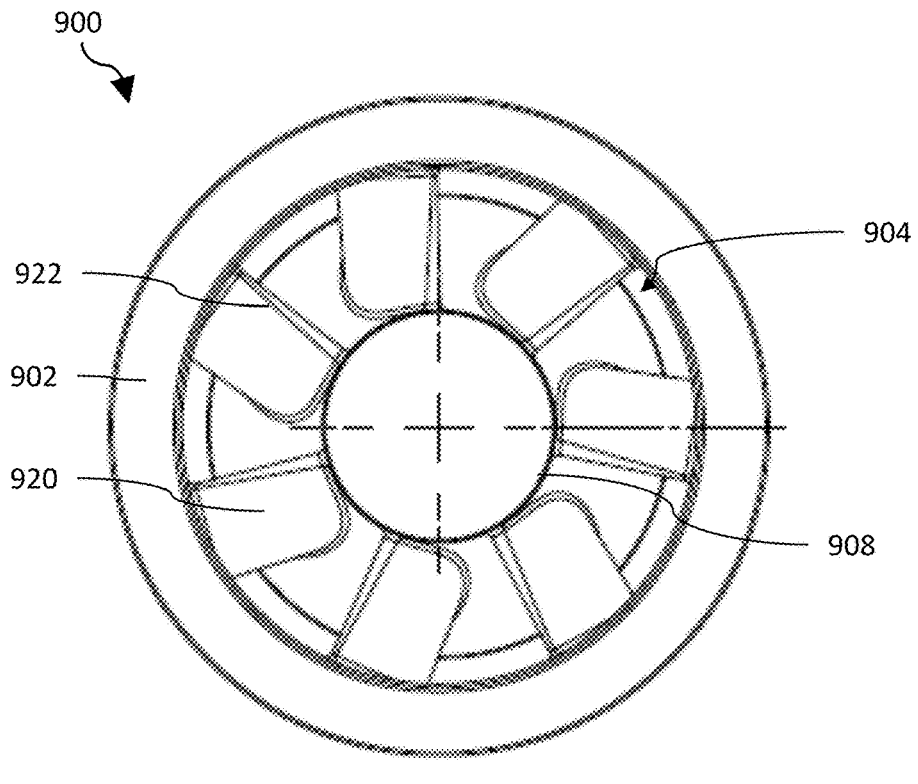
FIG. 9B is a top view of an inlet side of the mixed flow impeller of FIG. 9A.
Figure 9C:
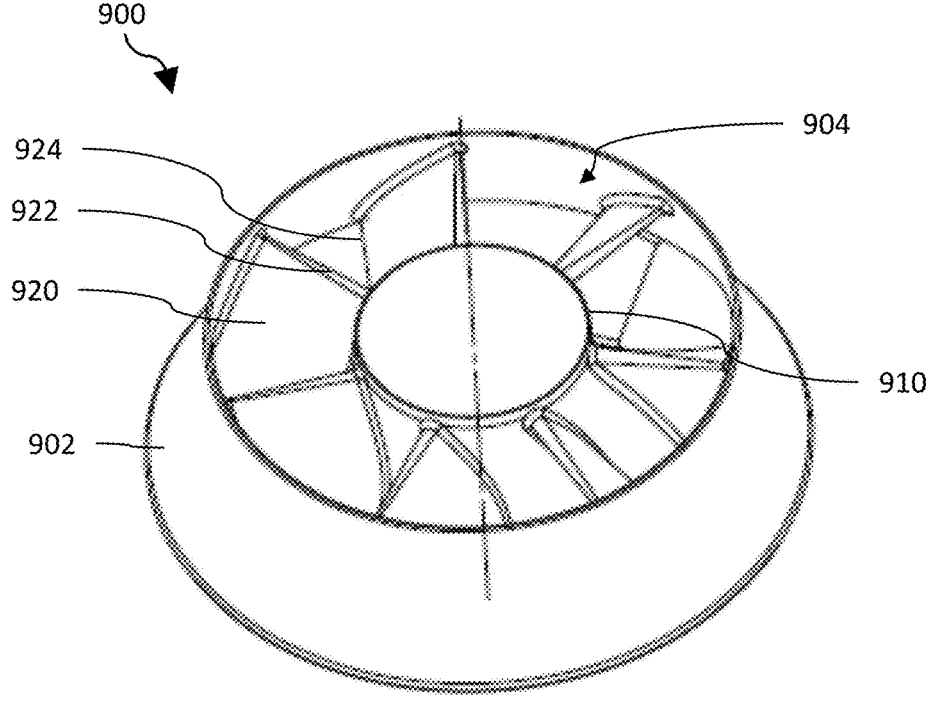
FIG. 9C is a perspective view of the inlet side 901 of the mixed flow impeller.
Figure 9D:
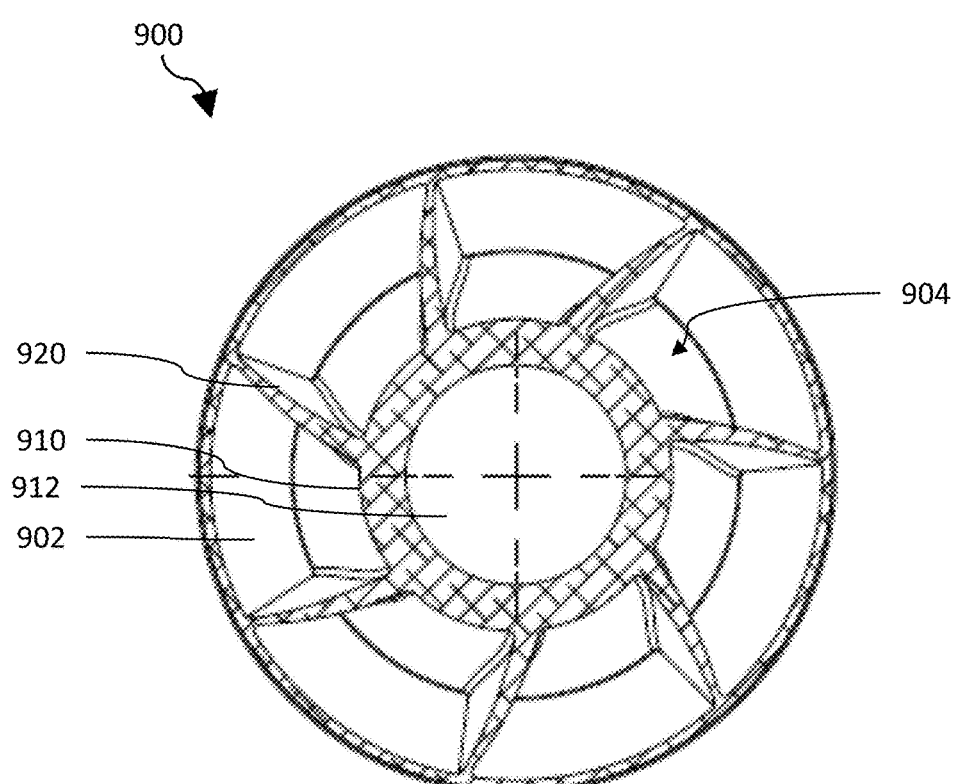
FIG. 9D is a cross-sectional view of the inlet side of the mixed flow impeller, taken along line A-A of FIG. 9A.
Figure 9E:
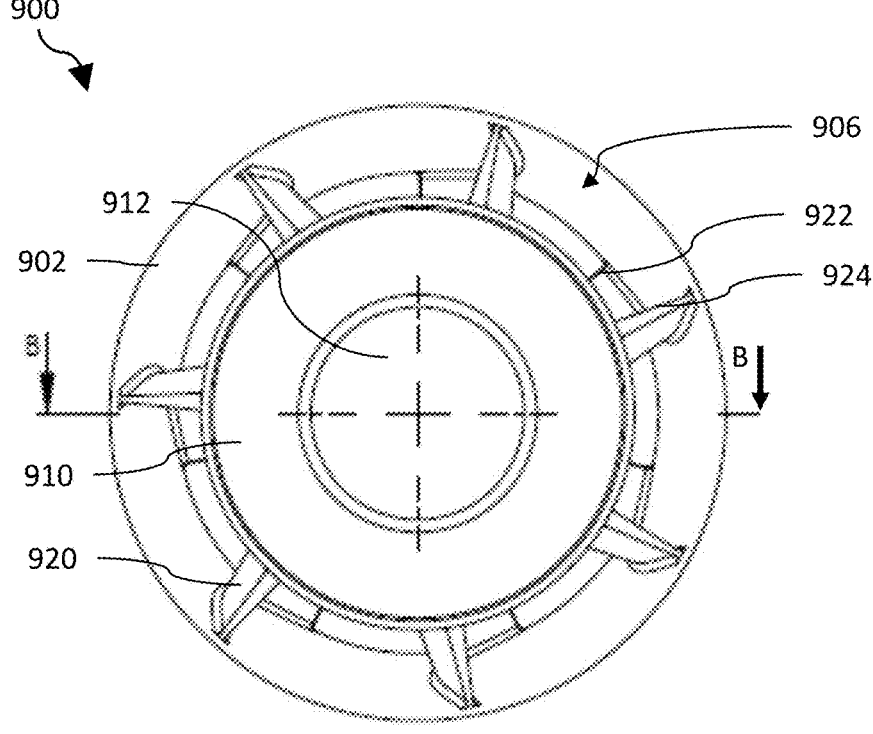
FIG. 9E is a top view of an outlet side of the mixed flow impeller.
Figure 9F:
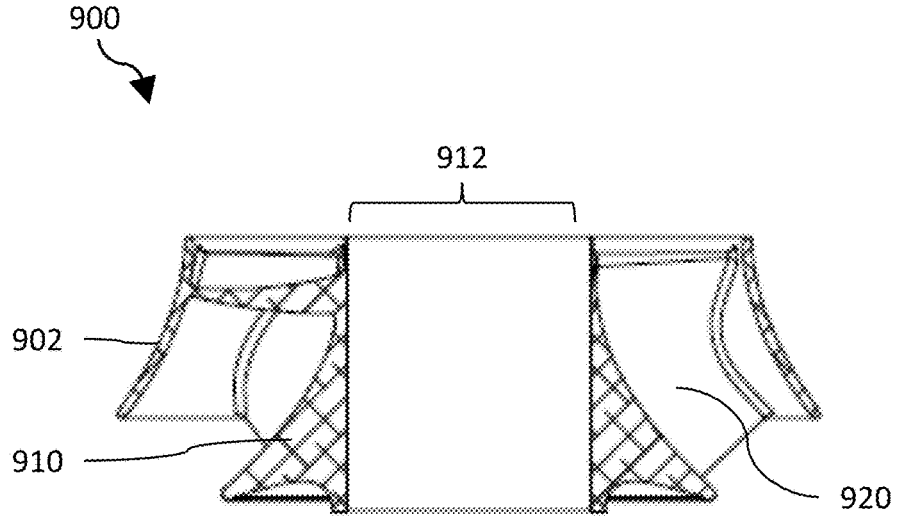
FIG. 9F is a cross-sectional view taken along line B-B of FIG. 9E.

FIG. 9A is top view of a mixed flow impeller 900, according to various embodiments of the present disclosure. FIG. 9B is a top view of an inlet side of the mixed flow impeller 900, and FIG. 9C is a perspective view of the inlet side of the mixed flow impeller 900. FIG. 9D is a cross-sectional view of the inlet side of the mixed flow impeller 900, taken along line A-A of FIG. 9A. FIG. 9E is a top view of an outlet side of the mixed flow impeller 900, and FIG. 9F is a cross-sectional view taken along line B-B of FIG. 9E.

Figure 10A:
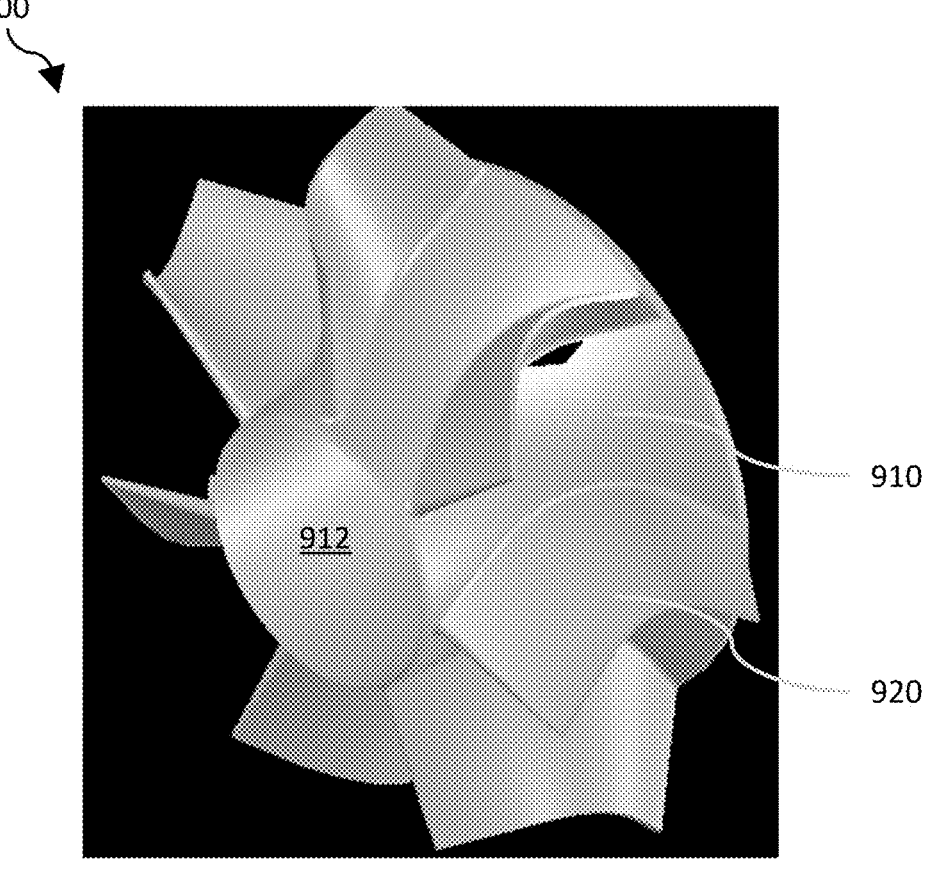
FIG. 10A is a perspective view of the mixed flow impeller without a shroud, FIG. is an outlet side view of the shroud-less mixed flow impeller.
Figure 10B:
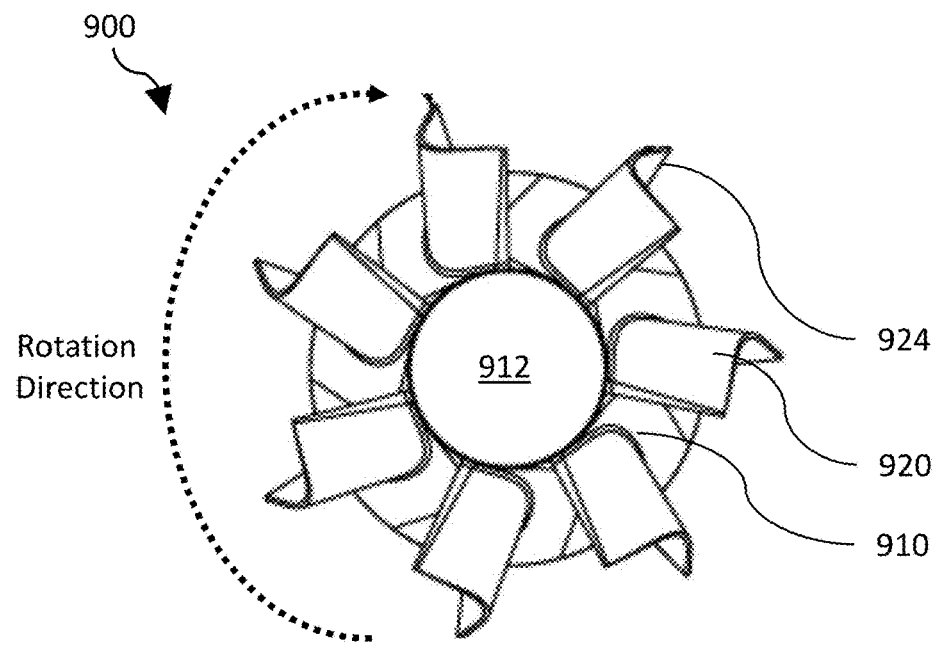
FIG. 10C is an inlet side view of the shroud-less mixed flow impeller.
FIG. 10D is a top view of the shroud-less mixed flow impeller.
FIG. 10E is a cross-sectional view taken along line B-B of FIG. 10D.
Figure 10C:
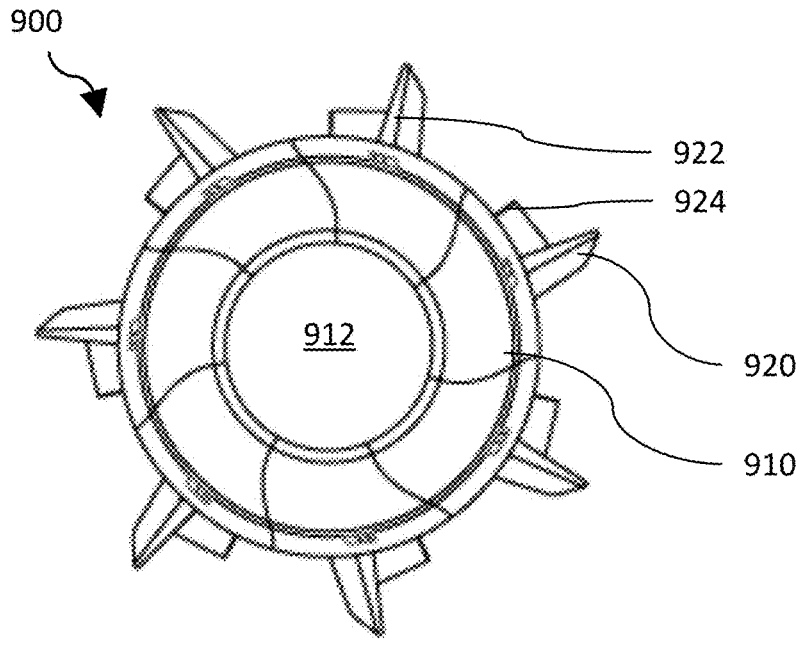
Figure 10D:
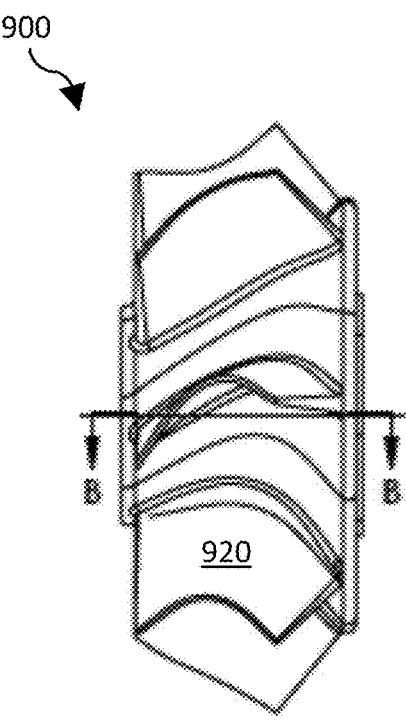
Figure 10E:
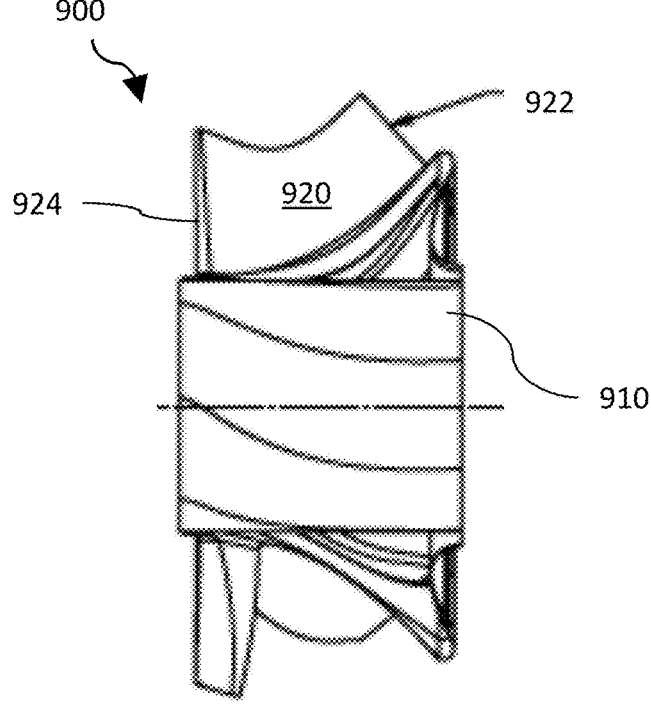

FIG. 10A is a perspective view of the mixed flow impeller 900 without a shroud 902, FIG. 10B is an outlet side view of the shroud-less mixed flow impeller 900, FIG. 10C is an inlet side view of the shroud-less mixed flow impeller 900, FIG. 10D is a top view of the shroud-less mixed flow impeller 900, and FIG. 10E is a cross-sectional view taken along line B-B of FIG. 10D.

Referring to FIGS. 9A-9E and 10A-10E, the mixed flow impeller 900 may include a shroud 902 an annular inlet 904, an opposing annular outlet 906, a hub 910, and blades 920. The inlet 904 may be at least partially defined by first ends of the shroud 902 and the hub 910. The outlet 906 may be at least partially defined by opposing ends of the shroud 902 and the hub 910.

The shroud 902 may be generally conical-like, or may have another suitable shape. The diameter of the shroud 902 may increase from the inlet 904 to the outlet 906. The hub 910 may be generally conical-like, or may have another suitable shape. The diameter of the hub 910 may increase from the inlet 904 to the outlet 906. The hub 910 may include a mounting channel 912 configured to receive a motor shaft 430.

The blades 920 may extend from the hub 910 to the shroud 902. The blades 920 may also extend from the inlet 904 to the outlet 906. In some embodiments, the hub 910 and the blades 920 may be formed as an integral, contiguous object, such as by casting, machining, molding, 3D printing, etc. The blades 920 may each include a leading edge 922 adjacent the inlet 904 and a trailing edge 924 adjacent the outlet 906.

The mixed flow impeller 900 may have any number of blades 920, and the number of blades 920 may vary per application of the mixed flow impeller 900. For example, the impeller 900 may be implemented in a blower 401 which may correspond to the CPOx blower 180 (e.g., air blower for the CPOx for system start-up), the system blower 182 (e.g., main air blower for providing air into the fuel cell stacks), and/or the anode recycle blower 184, as shown in FIG. 3. Alternatively, the blower 401 may be used in a different system than the fuel cell system described above.

The blades 920 may have a curvature configured to impart mixed radial and centrifugal forces to a fluid flowing through the mixed flow impeller 900. For example, as shown in FIG. 9A, the blades 920 may be configured to receive a fluid stream, such as air flowing in a direction substantially parallel to a rotational axis RA of the mixed flow impeller 900. A first air current C1 may exit the outlet 906 at an angle ranging from about 30° to about 60°, such as from about 40° to about 50°, or about 45°, with respect to the rotational axis RA.

The shroud 902 may be curved to induce the formation of a second current C2 of air outside of the mixed flow impeller 900. The second current C2 may flow past the outlet 906 at an angle ranging from about 30° to about 60°, such as from about 40° to about 50°, or about 45°, with respect to the rotational axis RA.

As shown in FIG. 10B, when viewed from the outlet side, the mixed flow impeller 900 may be configured to rotate in a clockwise direction. In contrast, the centrifugal impeller 500 (see FIG. 8A), may be configured to rotate in a counter clockwise direction, when viewed from the inlet side thereof. In other words, the mixed flow impeller 900 and the centrifugal impeller 500 may be configured to receive fluids from opposite directions.

Figure 11:
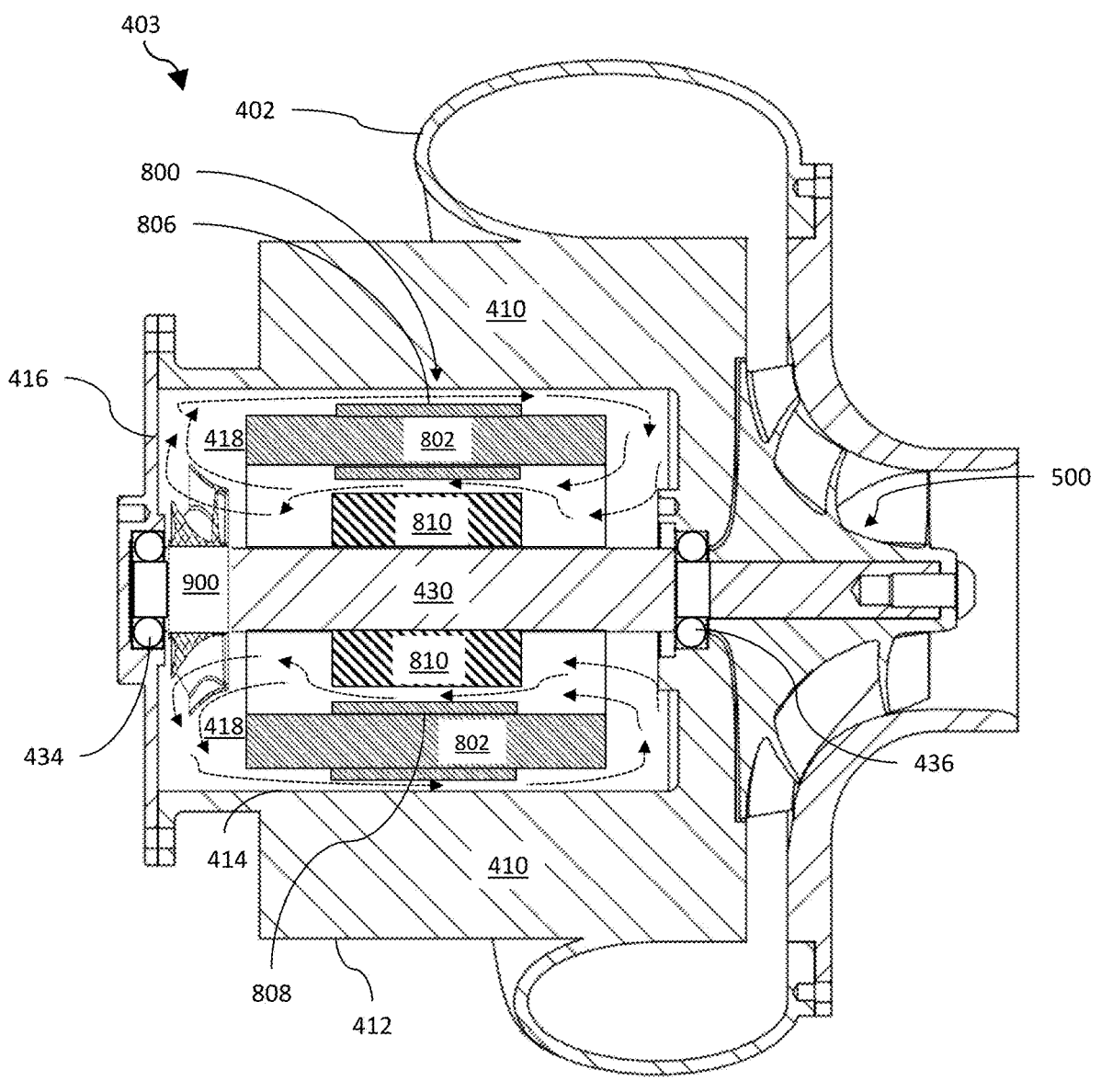
FIG. 11 is a cross-sectional view of a modified blower, according to various embodiments of the present disclosure.

FIG. 11 is a cross-sectional view of a modified blower 403, according to various embodiments of the present disclosure. The blower 403 may include similar components to the blower 401 of FIGS. 8A-8B. Accordingly, only the differences therebetween will be described in detail.

Referring to FIG. 11, the blower 403 may include a mixed flow impeller 900 disposed on the motor shaft 430, between the motor 800 and the motor cover 416. In some embodiments, the blower 403 may also include a second mixed flow impeller (not shown) disposed on the motor shaft 430, between the motor 800 and the second bearing 436.

It should be noted that the motor 800 containing the impeller 900 may be used in other types of blowers besides the blower shown in FIGS. 4A to 5C. The blower may be used in a fuel cell system or in another type of device. Furthermore, the motor 800 may be used in other devices besides a blower.

Various embodiments provide a low-cost, low-power consumption solution to effectively cool motor bearings and improve overall heat transfer, thereby improving reliability and extending service life of a blower motor. In particular, various embodiments provide direct bearing cooling by utilizing high-speed air flow generated by the shrouded mixed flow impeller 900. The core flow from the mixed flow impeller 900 may also induce flow outside the mixed flow impeller 900 to form mixed currents circulating within the motor housing 410 enclosure, to improve the convective heat transfer through entire motor housing 410. The vacuum effect created in front of the mixed flow impeller 900 draws flow through the gap between motor stator 802 and rotor 810 to facilitate cooling of these components.

The shrouded mixed flow impeller 900 may be configured to aim the high-speed air current flow (core flow) at the bearing region (outer ring), and the inclined air impingement effectively transfers heat generated in the second bearing 436 towards the outer space of the motor housing 410. The induced current flow by the mixed flow impeller 900 also moves outwards, which increases the heat transfer from the second bearing 436. The induced current flow outside of the impeller shroud 902 mixes with the core flow current moving outwards carry heat to the inner surface of the housing 410. This further helps the heat dissipation around the bearing area.

Inside the motor housing 410, the vacuum effect formed in front of the mixed-flow impeller 900 creates air flow through the gap between rotor and stator. On the other side of the rotor, the flow movement around the bearing in the rear is also increased. The air in the motor housing 410 circulates 360 degrees around the stator 802 to allow much more effective heat dissipation. As a result, more heat can be transferred through the motor housing wall to outside of the motor housing.

Various embodiments provide blower cooling systems configured to more effectively cool a front bearing 436 and locally control hot spot formation. Various embodiments are also configured to provide global air circulation within the motor housing 410, to more effectively transfer heat to the heat to the outside of the housing 410. In addition, various embodiments do not require an extra power supply to provide cooling and have a low shaft power draw. In addition, various embodiments are configured to reduce the overall axial thrust, since the direction of the axial rotation of the mixed flow impeller 900 is opposite to the direction of axial rotation of the centrifugal impeller 500, with respect to the corresponding fluid inlet directions thereof. In addition, as compared to conventional designs utilizing an attached fan, various embodiments provide a lower cost and less operating noise.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A blower, comprising:
   a motor housing;
   a volute disposed on an outer surface of the motor housing;
   a motor shaft extending through the motor housing;
   a motor disposed in the motor housing and coaxially mounted to the motor shaft; and
   a mixed flow impeller disposed in the motor housing and coaxially mounted to the motor shaft,
   wherein the mixed flow impeller is configured to circulate air inside the motor housing, such that the air only flows in a first direction through the motor and the air only flows in an opposing second direction between the motor and the motor housing, and
   wherein the mixed flow impeller is configured such that the air flowing out of the motor is divided into a first air stream that flows through the mixed flow impeller, and a second air stream that flows between a shroud of the mixed flow impeller and the motor.

2. The blower of claim 1, further comprising a first bearing and a second bearing disposed in the motor housing and supporting the motor shaft.

3. The blower of claim 2, further comprising a centrifugal impeller coaxially mounted to the motor shaft and configured to force a fluid through the volute, wherein the second bearing is disposed between the centrifugal impeller and the motor.

4. The blower of claim 3, wherein the mixed flow impeller is disposed between the motor and the second bearing.

5. The blower of claim 4, wherein:
the centrifugal impeller is configured to receive the fluid flowing in the second direction; and
the mixed flow impeller is configured to receive air flowing in the first direction.

6. The blower of claim 3, further comprising a second mixed flow impeller disposed in the motor housing between the motor and the second bearing.

7. The blower of claim 3, wherein:
the centrifugal impeller is in fluid communication with the volute; and
the mixed flow impeller is not in fluid communication with the volute.

8. The blower of claim 2, wherein the mixed flow impeller comprises:
a hub mounted on the motor shaft;
the shroud which surrounds the hub;
an inlet formed between a first end of the hub and a first end of the shroud;
an outlet formed between a second end of the hub and a second end of the shroud; and
blades extending from the hub to the shroud.

9. The blower of claim 8, wherein the blades extend from the inlet to the outlet.

10. The blower of claim 8, wherein:
the mixed flow impeller is configured to receive the first air stream through the inlet and output a first current of air through the outlet; and
the first current is output at an angle ranging from about 30° to about 60°, with respect to a rotational axis of the mixed flow impeller.

11. The blower of claim 10, wherein the blades are configured to apply mixed axial and centrifugal forces to the received first air stream to generate the first current which impacts a sidewall of the motor housing above and below the second bearing.

12. The blower of claim 10, wherein the shroud is configured to induce the second air stream to generate a second current of air that flows past the outlet at an angle ranging from about 30° to about 60°, with respect to the rotational axis of the mixed flow impeller.

13. The blower of claim 1, wherein:
the motor comprises a rotor connected to the motor shaft and a stator surrounding the rotor; and
the mixed flow impeller is configured to circulate the air between an outer surface of the stator and the motor housing, and between an inner surface of the stator and the rotor.

14. The blower of claim 13, wherein the stator comprises protrusions configured to generate a Venturi effect between the outer surface of the stator and the motor housing, and between the inner surface of the stator and the rotor.

15. A method of cooling a motor disposed in a motor housing, the method comprising:
operating the motor to rotate a motor shaft and a mixed flow impeller mounted to the motor shaft and disposed in the motor housing, such that the mixed flow impeller circulates air within the motor housing such that the air only flows in a first direction through the motor and the air only flows in an opposing second direction between the motor and the motor housing;
wherein the air flowing out of the motor is divided into a first air stream that flows through the mixed flow impeller, and a second air stream that flows between a shroud of the mixed flow impeller and the motor.

16. The method of claim 15, wherein the mixed flow impeller comprises:
a hub mounted on the motor shaft;
the shroud which surrounds the hub;
an inlet formed between a first end of the hub and a first end of the shroud;
an outlet formed between a second end of the hub and a second end of the shroud; and
blades extending from the hub to the shroud.

17. The method of claim 16, wherein:
the blades extend from the inlet to the outlet;
the mixed flow impeller receives the first air stream through the inlet and outputs a first current of the air through the outlet;
the first current is output at an angle ranging from about 30° to about 60°, with respect to a rotational axis of the mixed flow impeller and impacts a sidewall of the motor housing; and
the shroud induces the second air stream to generate a second current of the air that flows past the outlet at an angle ranging from about 30° to about 60°, with respect to the rotational axis of the mixed flow impeller.

* * * * *